(12) United States Patent
Bremser et al.

(10) Patent No.: US 7,935,746 B2
(45) Date of Patent: *May 3, 2011

(54) POWDER COATING SUSPENSION, PROCESS FOR PREPARING THE SAME AND PROCESS FOR PREPARING POWDER COATING MATERIAL

(75) Inventors: Wolfgang Bremser, Münster (DE); Werner-Alfons Jung, Ascheberg (DE); Michael Stang, Ludwigshafen (DE); Heiko Wolf, Frankenthal (DE)

(73) Assignee: BASF Coatings AG, Munster (DE)

( * ) Notice: Subject to any disclaimer, the term of this patent is extended or adjusted under 35 U.S.C. 154(b) by 1723 days.

This patent is subject to a terminal disclaimer.

(21) Appl. No.: 10/476,636

(22) PCT Filed: May 24, 2002

(86) PCT No.: PCT/EP02/05699
§ 371 (c)(1),
(2), (4) Date: Oct. 30, 2003

(87) PCT Pub. No.: WO02/098932
PCT Pub. Date: Dec. 12, 2002

(65) Prior Publication Data
US 2004/0132902 A1    Jul. 8, 2004

(30) Foreign Application Priority Data
Jun. 1, 2001 (DE) .................................. 101 26 651

(51) Int. Cl.
*C08J 3/05* (2006.01)
*B05D 7/02* (2006.01)
*B05D 7/06* (2006.01)
*B05D 7/14* (2006.01)

(52) U.S. Cl. ............. 523/335; 427/407.1; 427/408; 427/409; 427/412.1

(58) Field of Classification Search .................. 523/335; 427/407.1, 406, 409, 412.1
See application file for complete search history.

(56) References Cited

U.S. PATENT DOCUMENTS

| | | |
|---|---|---|
| 2,979,514 A | 4/1961 | O'Brien et al. |
| 3,341,580 A | 9/1967 | Hechenbleikner |
| 3,477,990 A | 11/1969 | Dante et al. |
| 3,479,328 A | 11/1969 | Nordstrom |
| 3,552,986 A | 1/1971 | Bassemir ............... 117/12 |
| 3,577,476 A | 5/1971 | Gurney ............... 260/668 |
| 3,674,838 A | 7/1972 | Nordstrom |
| 3,781,379 A | 12/1973 | Theodore et al. |
| 3,974,303 A | 8/1976 | Iwase et al. |
| 4,064,161 A | 12/1977 | Lewis et al. |
| 4,085,168 A | 4/1978 | Milkovich et al. ............... 260/886 |
| 4,091,048 A | 5/1978 | Labana et al. |
| 4,126,747 A | 11/1978 | Cowherd, III et al. |
| 4,129,488 A | 12/1978 | McGinniss |
| 4,163,810 A | 8/1979 | McGinniss |
| 4,208,313 A | 6/1980 | Lewis et al. |
| 4,268,542 A | 5/1981 | Sakakibara et al. |
| 4,279,833 A | 7/1981 | Culbertson et al. |
| 4,301,257 A | 11/1981 | Zengel et al. |
| 4,340,497 A | 7/1982 | Knopf |
| 4,413,036 A | 11/1983 | Drexler et al. ............... 428/458 |
| 4,424,252 A | 1/1984 | Nativi |
| 4,444,954 A | 4/1984 | Mels et al. |
| 4,521,580 A | 6/1985 | Turner et al. ............... 526/307.2 |
| 4,533,701 A | 8/1985 | Kusumoto et al. ............... 525/370 |
| 4,634,602 A | 1/1987 | Sirkoch et al. |
| 4,636,545 A | 1/1987 | König et al. ............... 524/457 |
| 4,656,226 A | 4/1987 | Hutchins et al. ............... 525/93 |
| 4,675,234 A | 6/1987 | Sachs et al. |
| 4,677,003 A | 6/1987 | Redlich et al. ............... 427/373 |
| 4,710,542 A | 12/1987 | Forgione et al. |
| 4,754,014 A | 6/1988 | Ryntz et al. |
| 4,758,632 A | 7/1988 | Parekh et al. |
| 4,828,826 A | 5/1989 | Franz et al. |
| 4,939,213 A | 7/1990 | Jacobs, III et al. |
| 5,047,454 A | 9/1991 | Cowles et al. |
| 5,084,541 A | 1/1992 | Jacobs, III et al. |
| 5,126,393 A | 6/1992 | Blum et al. ............... 524/538 |
| 5,244,649 A | 9/1993 | Ostertag et al. |
| 5,288,865 A | 2/1994 | Gupta |
| 5,322,715 A | 6/1994 | Jouck et al. ............... 427/409 |
| 5,379,947 A | 1/1995 | Williams et al. |
| 5,385,996 A | 1/1995 | Rizzardo et al. ............... 526/240 |
| 5,395,903 A | 3/1995 | Charmot et al. ............... 526/220 |
| 5,475,073 A | 12/1995 | Guo |

(Continued)

FOREIGN PATENT DOCUMENTS

| | | |
|---|---|---|
| CA | 2004988 | 12/1989 |
| CA | 2086156 | 12/1992 |
| CA | 2127919 | 7/1994 |
| CA | 2181934 | 7/1996 |
| CA | 235620 | 6/2000 |
| CA | 2103595 | 8/2002 |
| CA | 2259559 | 9/2002 |
| DE | 1071241 A | 12/1959 |
| DE | 1185819 A | 1/1965 |
| DE | 2003579 A | 7/1970 |

(Continued)

OTHER PUBLICATIONS

Bremser, et al., U.S. Appl. No. 10/474,830, filed Oct. 10, 2003.

(Continued)

*Primary Examiner* — William Phillip Fletcher, III
(74) *Attorney, Agent, or Firm* — Cantor Colburn LLP

(57) ABSTRACT

Disclosed herein is a powder coating suspension prepared by a method comprising (1) emulsifying a liquid component comprising a liquid starting product in an aqueous medium in the presence of an emulsifier whose aqueous solution at the critical micelle concentration (CMC) has a surface tension >30 mN/m to give an aqueous emulsion of liquid particles and (2) cooling the emulsion so that a suspension of dimensionally stable particles is formed. Also disclosed are a process for preparing a powder coating suspension and a process for preparing a powder coating material.

21 Claims, No Drawings

U.S. PATENT DOCUMENTS

| | | | |
|---|---|---|---|
| 5,480,493 A | 1/1996 | Harry, Jr. | |
| 5,516,559 A | 5/1996 | Röckrath et al. | 427/407.1 |
| 5,521,229 A | 5/1996 | Lu et al. | 522/40 |
| 5,534,598 A | 7/1996 | Guo | |
| 5,565,508 A | 10/1996 | Hoenel et al. | 523/414 |
| 5,601,880 A | 2/1997 | Schwarte et al. | 427/407.1 |
| 5,670,557 A | 9/1997 | Dietz et al. | 522/184 |
| 5,773,543 A | 6/1998 | Rizzardo et al. | 526/215 |
| 5,830,927 A | 11/1998 | Vanderhoff et al. | 522/81 |
| 5,830,928 A | 11/1998 | Faler et al. | 523/502 |
| 5,840,372 A | 11/1998 | Rink et al. | 427/407.1 |
| 5,854,353 A | 12/1998 | Knoll et al. | 525/314 |
| 5,857,998 A | 1/1999 | Barry | 604/96 |
| 5,859,112 A | 1/1999 | Overbeek et al. | 524/460 |
| 5,905,132 A | 5/1999 | Wegner et al. | 528/45 |
| 5,959,026 A | 9/1999 | Abusleme et al. | 524/758 |
| 5,969,030 A | 10/1999 | Grandhee | 524/457 |
| 5,972,809 A | 10/1999 | Faler et al. | 442/103 |
| 5,990,221 A | 11/1999 | Dames et al. | 524/457 |
| 6,020,438 A | 2/2000 | Lubnin et al. | 525/317 |
| 6,046,259 A | 4/2000 | Das et al. | 524/40 |
| 6,100,350 A | 8/2000 | Wilczek et al. | 526/82 |
| 6,140,386 A | 10/2000 | Vanderhoff et al. | 522/78 |
| 6,159,556 A | 12/2000 | Moller et al. | |
| 6,160,049 A | 12/2000 | Mathauer et al. | 524/804 |
| 6,162,886 A | 12/2000 | Bremer et al. | 526/318.42 |
| 6,221,949 B1 | 4/2001 | Gross et al. | 524/451 |
| 6,235,857 B1 | 5/2001 | Rizzardo et al. | 526/220 |
| 6,291,579 B1 * | 9/2001 | Kalck et al. | 524/832 |
| 6,344,501 B1 | 2/2002 | Sierakowski et al. | |
| 6,346,591 B1 | 2/2002 | Ohrbom et al. | 526/312 |
| 6,403,709 B2 | 6/2002 | Ramesh et al. | 525/95 |
| 6,462,139 B1 | 10/2002 | Das et al. | |
| 6,503,983 B1 | 1/2003 | Morrison et al. | 524/804 |
| 6,506,636 B2 | 1/2003 | Yamazaki et al. | 438/149 |
| 6,506,836 B1 * | 1/2003 | Bremser et al. | 525/64 |
| 6,512,026 B1 | 1/2003 | Ott et al. | |
| 6,534,588 B1 | 3/2003 | Löcken et al. | 524/591 |
| 6,566,476 B2 | 5/2003 | Ohrbom et al. | 526/312 |
| 6,624,275 B2 | 9/2003 | Ohrbom et al. | 526/320 |
| 6,670,043 B2 | 12/2003 | Barkac et al. | |
| 2002/0035289 A1 | 3/2002 | Walter et al. | 560/157 |
| 2002/0086966 A1 | 7/2002 | Weise et al. | 526/312 |
| 2002/0103319 A1 | 8/2002 | Ohrbom et al. | 526/312 |
| 2002/0132921 A1 | 9/2002 | Ramesh et al. | 525/88 |
| 2003/0078337 A1 | 4/2003 | Bremser et al. | 524/502 |
| 2003/0091832 A1 | 5/2003 | Ohrbom et al. | 428/423.1 |
| 2003/0100673 A1 | 5/2003 | Bendix et al. | 524/801 |
| 2003/0143414 A1 | 7/2003 | Bendix et al. | 428/500 |

FOREIGN PATENT DOCUMENTS

| | | |
|---|---|---|
| DE | 2214650 A | 10/1972 |
| DE | 2436186 A1 | 3/1975 |
| DE | 2710421 A1 | 9/1977 |
| DE | 2749567 A1 | 5/1978 |
| DE | 2749576 A1 | 5/1979 |
| DE | 3316593 A1 | 11/1984 |
| DE | 3706095 A1 | 8/1987 |
| DE | 3546594 | 12/1987 |
| DE | 3636156 A1 | 4/1988 |
| DE | 3636183 A1 | 9/1988 |
| DE | 3807571 A1 | 9/1988 |
| DE | 3718446 A1 | 12/1988 |
| DE | 3719804 A1 | 3/1989 |
| DE | 3836370 A1 | 5/1990 |
| DE | 3930601 A1 | 3/1991 |
| DE | 4038681 A1 | 6/1992 |
| DE | 4203278 A1 | 8/1993 |
| DE | 4204266 A1 | 8/1993 |
| DE | 4222194 A1 | 1/1994 |
| DE | 4401544 A1 | 7/1995 |
| DE | 4421823 A1 | 1/1996 |
| DE | 19613547 A1 | 11/1996 |
| DE | 19618657 A1 | 1/1997 |
| DE | 19534361 A1 | 3/1997 |
| DE | 19540977 A1 | 5/1997 |
| DE | 19617086 A1 | 10/1997 |
| DE | 19631269 A1 | 2/1998 |
| DE | 196 52 813 | 6/1998 |
| DE | 19709467 C1 | 10/1998 |
| DE | 19736083 A1 | 2/1999 |
| DE | 19805421 C1 | 6/1999 |
| DE | 19809643 A1 | 9/1999 |
| DE | 19828742 A1 | 12/1999 |
| DE | 1985296 A1 | 2/2000 |
| DE | 19840605 A1 | 3/2000 |
| DE | 19841408 A1 | 3/2000 |
| DE | 19841842 A1 | 3/2000 |
| DE | 19860011 | 6/2000 |
| DE | 19908013 A1 | 8/2000 |
| DE | 19909752 | 9/2000 |
| DE | 19930067 | 1/2001 |
| DE | 19930664 | 1/2001 |
| DE | 19930665 | 1/2001 |
| DE | 10006673 C1 | 9/2001 |
| EP | 0650978 A1 | 5/1955 |
| EP | 0002866 A1 | 7/1979 |
| EP | 0008127 A1 | 8/1979 |
| EP | 0004571 A1 | 10/1979 |
| EP | 0054505 A1 | 6/1982 |
| EP | 0068311 A1 | 6/1982 |
| EP | 0245700 A2 | 11/1987 |
| EP | 0249201 A2 | 12/1987 |
| EP | 0264843 A2 | 4/1988 |
| EP | 0265820 A1 | 5/1988 |
| EP | 0276501 A2 | 8/1988 |
| EP | 0283852 A1 | 9/1988 |
| EP | 0293746 A1 | 12/1988 |
| EP | 0299420 A2 | 1/1989 |
| EP | 358221 | 9/1989 |
| EP | 0358153 A2 | 3/1990 |
| EP | 401565 | 5/1990 |
| EP | 0410242 A2 | 1/1991 |
| EP | 0417567 A2 | 3/1991 |
| EP | 498583 | 1/1992 |
| EP | 0536791 A1 | 4/1993 |
| EP | 0540884 A1 | 5/1993 |
| EP | 0568967 A2 | 11/1993 |
| EP | 0582051 A2 | 2/1994 |
| EP | 0604922 A1 | 7/1994 |
| EP | 0636669 A2 | 2/1995 |
| EP | 0650979 A1 | 5/1995 |
| EP | 0650985 A1 | 5/1995 |
| EP | 0652264 A2 | 5/1995 |
| EP | 0687714 A1 | 12/1995 |
| EP | 732359 | 3/1996 |
| EP | 755946 | 7/1996 |
| EP | 0767185 A1 | 4/1997 |
| EP | 0783534 B1 | 9/1998 |
| EP | 0928800 A1 | 7/1999 |
| EP | 0708788 B1 | 1/2000 |
| WO | WO9106535 | 5/1991 |
| WO | WO9213903 | 8/1992 |
| WO | WO9222355 | 12/1992 |
| WO | WO9222615 A1 | 12/1992 |
| WO | WO9322351 | 11/1993 |
| WO | WO9422968 A1 | 10/1994 |
| WO | WO9615157 | 5/1996 |
| WO | WO9712945 A1 | 4/1997 |
| WO | WO9746549 A1 | 12/1997 |
| WO | WO97455476 A1 | 12/1997 |
| WO | WO9801478 | 1/1998 |
| WO | WO 98/27141 A1 * | 6/1998 |
| WO | WO9837104 | 8/1998 |
| WO | WO9845356 A1 | 10/1998 |
| WO | WO9901499 A1 | 1/1999 |
| WO | WO9910413 | 3/1999 |
| WO | WO9914254 A1 | 3/1999 |
| WO | WO9915597 | 4/1999 |
| WO | WO 00/37507 A1 * | 6/2000 |

OTHER PUBLICATIONS

Basf Corp. U.S. Appl. No. 09/263,426, filed Mar. 5, 1999.
Bartol, et al., U.S. Appl. No. 09/263,426, filed Mar. 5, 1999.
Rink et al., U.S. Appl. No. 09/830,694, filed Apr. 27, 2003.
Meiseuburg, et al., U.S. Appl. No. 09/926,532, filed Nov. 16, 2001.

Mangels, et al., U.S. Appl. No. 10/088,376, filed Mar. 11, 2002.
Nickolaus et al., U.S. Appl. No. 10/250,586, filed Jul. 2, 2003.
Ramesh, et al., U.S. Appl. No. 10/455,066, filed Jun. 5, 2003.
Baumgart, et al., U.S. Appl. No. 10/049,656, filed Feb. 13, 2002.
Rink, et al., U.S. Appl. No. 10/049,607, filed Feb. 14, 2002.
Nickolaus et al., U.S. Appl. No. 10/250,694, filed Jul. 3, 2003.
Bendix et al., U.S. Appl. No. 10/148,428, filed May 29, 2002.
Clauss, U.S. Appl. No. 10/148,295, filed May 29, 2002.
Bremser, U.S. Appl. No. 10/018,703, filed Dec. 13, 2001.
Bremser, U.S. Appl. No. 10/018,352, filed Dec. 7, 2001.
Bremser, U.S. Appl. No. 10/018,351, filed Dec. 7, 2001.
Bendix et al., U.S. Appl. No. 10/148,427, filed May 29, 2002.
English Abstract for DE3546594 from EPO, Dec. 10, 1987.
English Abstract for EP 0 358 221 from EPO, Mar. 14, 1990.
Derwent Accession No. 1996-094214 English Abstract for JP08003208, Jan. 9, 1996.
Derwent Accession No. 1999-502399 English Abstract for JP11217409, Aug. 10, 1999.
Derwent Accession No. 1986-152526 English Abstract for JP61085417, May 1, 1986.
Derwent Accession No. 1996-056019 English Abstract for JP07316242, Dec. 5, 1995.
Bremser, U.S. Appl. No. 10/018,350, filed Dec. 7, 2001.
English Abstract for Knoll, et al., EP 732 359, filed Sep. 18, 1996.
International Preliminary Examination Report of International Application No. PCT/EP02/05699 dated Dec. 12, 2002.

* cited by examiner

POWDER COATING SUSPENSION, PROCESS FOR PREPARING THE SAME AND PROCESS FOR PREPARING POWDER COATING MATERIAL

CROSS REFERENCE TO RELATED APPLICATIONS

This application is a National Phase Application of Patent Application PCT/EP002/05699 filed on May 24, 2002, which claims priority to DE 101 26 651.0, filed on 1 Jun. 2001.

BACKGROUND

The present invention relates to novel powder coating suspensions (powder slurries) and powder coating materials preparable by an emulsification process. The present invention also relates to a process for preparing novel powder coating suspensions (powder slurries) and powder coating materials by emulsification. The present invention additionally relates to the use of the novel powder coating suspensions (powder slurries) and powder coating materials as coating materials, adhesives, and sealing compounds for coating, bonding, and sealing motor vehicle bodies and parts thereof, the interior and exterior of motor vehicles, the inside and outside of buildings, and doors, windows, and furniture, and for coating, bonding, and sealing in the context of the industrial coating particularly of small parts, coils, containers, packaging, electrical components, and white goods.

Powder coating materials in the form of aqueous suspensions which are substantially free from organic solvents and may be processed using liquid coating technologies, and processes for preparing them by melt emulsification, are known from the German patent application DE 196 52 813 A1. In this known process, the binders, the crosslinking agents, and any further additives are fed in the form of viscous resin melts into the dispersing equipment, in which they are dispersed finely in the liquid phase. Alternatively, before their dispersing in the dispersing equipment in the liquid state, the ingredients may first of all be mixed homogeneously with one another and then, in a second step, dispersed finely in the liquid phase. Thereafter, the resulting emulsion is converted by cooling into a suspension containing solid, finely divided particles. The key advantage of this process is that there is no need for complicated grinding processes, which under certain circumstances may damage the dispersions, in order to adjust the particles to the required size. Moreover, finer power coating suspensions can be produced by means of melt emulsification than by the grinding processes.

The German patent application does not disclose the isolation of the dispersed or suspended powder coating particles.

According to column 7 lines 4 to 9 of DE 196 52 813 A1, use may be made as stabilizers, dispersants or emulsifiers of short-chain amphiphilic polyacrylates prepared from acrylic acid, ethylhexyl acrylate, hydroxyethyl acrylate and an anionic comonomer in lyotropic phase by means of transfer polymerization. The surface tension of aqueous solutions of the emulsifiers at the critical micelle concentration (CMC), however, is not specified.

Powder slurries prepared by melt emulsification are also described in the German patent applications DE 100 06 673.9 and DE 100 18 581.9, unpublished at the priority date of the present specification. The resulting dispersed powder coating particles, however, are not isolated and used as powder coating materials. Emulsifiers used include nonionic emulsifiers such as alkoxylated alkanols and polyols, phenols and alkylphenols, or anionic emulsifiers such as alkali metal salts or ammonium salts of alkanecarboxylic acids, alkanesulfonic acids, and sulfo acids of alkoxylated alkanols and polyols, phenols and alkylphenols. The surface tension of aqueous solutions of the emulsifiers at the critical micelle concentration (CMC), however, is not specified.

Processes for preparing powder slurries and powder coating materials by melt emulsification are known from the international patent application WO 97/45476. According to page 13 lines 5 to 20 of the international patent application, emulsifiers are used in the process. In the case of an aqueous phase, polyethylene glycol or polyvinyl alcohol is used. The key factor is that the emulsifiers have an anchor component which links the emulsifiers to the melt by means of physical adsorption or chemical reaction. Examples of suitable anchor components are polar (meth)acrylate copolymers or the corresponding groups. The surface tension of aqueous solutions of the emulsifiers at the critical micelle concentration (CMC), however, is not specified.

Processes for preparing powder slurries and powder coating materials by melt emulsification are known from the international patent application WO 98/45356. Ionic and non-ionic emulsifiers (surfactants) are used. Ionic emulsifiers used include the in situ reaction products of the carboxyl-containing olefin copolymers used in the process with ammonium hydroxide, triethanolamine, morpholine, and dimethylethanolamine. Preferred nonionic emulsifiers are alkylphenol thioxylates and ethylene oxide-propylene glycol copolymers. The surface tension of aqueous solutions of the emulsifiers at the critical micelle concentration (CMC), however, is not specified.

The processes known to date for preparing powder slurries and powder coating materials by melt emulsification have the disadvantage that the stabilizers, dispersants or emulsifiers employed are only able to effect adequate stabilization of either the emulsified melted particles formed to start with or the suspended solid particles which result after cooling of the emulsion, but not both simultaneously. With the known processes, therefore, there is a risk that they will react adversely even to slight variations in the process conditions and will not produce powder slurries and powder coating materials that meet the specification.

The use of dispersions of copolymers preparable in aqueous media by single-stage or multistage free-radical copolymerization of
a) at least one olefinically unsaturated monomer and
b) at least one olefinically unsaturated monomer different than the olefinically unsaturated monomer (a) and of the general formula I $$R^1R^2C=CR^3R^4 \qquad (I)$$

in which the radicals $R^1$, $R^2$, $R^3$, and $R^4$ each independently of one another are hydrogen atoms or substituted or unsubstituted alkyl, cycloalkyl, alkylcycloalkyl, cycloalkylalkyl, aryl, alkylaryl, cycloalkylaryl, arylalkyl or arylcycloalkyl radicals with the proviso that at least two of the variables $R^1$, $R^2$, $R^3$ and $R^4$ are substituted or unsubstituted aryl, arylalkyl or arylcycloalkyl radicals, especially substituted or unsubstituted aryl radicals, as binders in coating materials, especially aqueous basecoat materials (cf. the German patent application DE 199 30 665 A1), primer-surfacers and antistonechip primers (cf. the German patent application DE 199 30 067 A1), and clearcoat materials (cf. the German patent application DE 199 30 664 A1) is known. Their use as stabilizers, emulsifiers or dispersants is not described in the patent applications.

It is an object of the present invention to find novel powder coating suspensions (powder slurries) and powder coating materials preparable by an emulsification process simply, reliably and reproducibly and meeting given specifications.

SUMMARY

It is also an object of the present invention to find a novel process for preparing powder coating suspensions (powder slurries) and power coating materials which no longer has the disadvantage of the prior art but which instead provides on-specification powder slurries and powder coating materials simply, reliably and reproducibly.

It is a further object of the present invention to provide novel stabilizers, dispersants or emulsifiers for processes for preparing powder slurries and powder coating materials by emulsification which provide the requisite stabilization of both the emulsified liquid particles formed to start with and the dimensionally stable powder coating particles which result after the emulsion has cooled, simultaneously.

The invention accordingly provides for the novel use of copolymers preparable in an aqueous medium by single-stage or multistage free-radical copolymerization of
(a) at least one olefinically unsaturated monomer and
(b) at least one olefinically unsaturated monomer different from the olefinically unsaturated monomer (a) and of the general formula I

$$R^1R^2C=CR^3R^4 \quad (I)$$

in which the radicals $R^1$, $R^2$, $R^3$, and $R^4$ each independently of one another are hydrogen atoms or substituted or unsubstituted alkyl, cycloalkyl, alkylcycloalkyl, cycloalkylalkyl, aryl, alkylaryl, cycloalkylaryl, arylalkyl or arylcycloalkyl radicals with the proviso that at least two of the variables $R^1$, $R^2$, $R^3$ and $R^4$ are substituted or unsubstituted aryl, arylalkyl or arylcycloalkyl radicals, especially substituted or unsubstituted aryl radicals,
as emulsifiers.

In the text below, the novel use of the copolymers as emulsifiers is referred to as "inventive use".

The invention also provides the novel powder coating suspensions (powder slurries) and powder coating materials, the powder slurries being preparable by
(1) emulsifying at least one liquid component comprising at least one liquid starting product in an aqueous medium to give an aqueous emulsion of liquid particles and
(2) cooling the emulsion so that a suspension of dimensionally stable particles is formed
and the powder coating materials being preparable by
(1) emulsifying at least one liquid component comprising at least one liquid starting product in an aqueous medium to give an aqueous emulsion of liquid particles and
(2) cooling the emulsion so that a suspension of dimensionally stable particles is formed, and then
(3) isolating the dimensionally stable particles,
these procedures being carried out using at least one emulsifier whose aqueous solution at the critical micelle concentration (CMC) has a surface tension >30 mN/m.

In the text below, the novel powder slurries and powder coating materials are referred to as "powder slurries and powder coating materials of the invention".

Additionally, the invention provides the novel process for preparing powder coating suspensions (powder slurries) and powder coating materials by emulsification of their constituents, the powder slurries being prepared by
(1) emulsifying at least one liquid component comprising at least one liquid starting product in an aqueous medium to give an aqueous emulsion of liquid particles and
(2) cooling the emulsion so that a suspension of dimensionally stable particles is formed
and the powder coating materials being prepared by
(1) emulsifying at least one liquid component comprising at least one liquid starting product in an aqueous medium to give an aqueous emulsion of liquid particles and
(2) cooling the emulsion so that a suspension of dimensionally stable particles is formed, and then
(3) isolating the dimensionally stable particles, these procedures being carried out using at least one emulsifier whose aqueous solution at the critical micelle concentration (CMC) has a surface tension >30 mN/m.

In the text below, the novel process for preparing powder slurries and powder coating materials by melt emulsification is referred to as the "process of the invention".

DETAILED DESCRIPTION

In the light of the prior art it was surprising and unforeseeable for the skilled worker that the object on which the present invention was based could be achieved by means of the inventive use, the process of the invention and the powder slurries and powder coating materials of the invention. More surprising still was that it was the copolymers of the monomers (a) and (b), hitherto used only as binders, that had the properties required for them to be considered for the process of the invention.

For the preparation of the powder slurries and powder coating materials of the invention it is inventive to use an emulsifier whose aqueous solution at the critical micelle concentration (CMC) has a surface tension >30, preferably >35, and in particular >40 mN/m.

In the context of the present invention, the critical micelle concentration (CMC) is the characteristic concentration at which above a certain temperature (the Krafft point) micelles form from surfactant molecules in aqueous solutions (cf. Römpp-Chemie-Lexikon, Georg Thieme Verlag, Stuttgart, New York, 9th edition, 1991, volume 4, pages 2769 and 2770, "micelles").

Accordingly, emulsifiers suitable for preparing the powder slurries and powder coating materials of the invention are all ionic and nonionic emulsifiers which meet this condition.

Particularly preferred emulsifiers for inventive use are copolymers preparable by single-stage or multistage, especially single-stage, free-radical, especially controlled free-radical, copolymerization of
(a) at least one olefinically unsaturated monomer and
(b) at least one olefinically unsaturated monomer different than the olefinically unsaturated monomer (a) and of the general formula I

$$R^1R^2C=CR^3R^4 \quad (I),$$

in which the radicals $R^1$, $R^2$, $R^3$ and $R^4$ each independently of one another are hydrogen atoms or substituted or unsubstituted alkyl, cycloalkyl, alkylcycloalkyl, cycloalkylalkyl, aryl, alkylaryl, cycloalkylaryl, arylalkyl or arylcycloalkyl radicals, with the proviso that at least two of the variables $R^1$, $R^2$, $R^3$ and $R^4$ are substituted or unsubstituted aryl, arylalkyl or arylcycloalkyl radicals, especially substituted or unsubstituted aryl radicals;
in an aqueous medium.
Examples of suitable monomers (a) are
(a1) substantially acid-group-free (meth)acrylic esters such as (meth)acrylic alkyl or cycloalkyl esters having up to 20 carbon atoms in the alkyl radical, especially methyl, ethyl, propyl, n-butyl, sec-butyl, tert-butyl, hexyl, ethylhexyl, stearyl and lauryl acrylate or methacrylate; cycloaliphatic (meth)acrylic esters, especially cyclohexyl, isobornyl, dicyclopentadienyl, octahydro-4,7-methano-1H-inden-emethanol or tert-butylcyclohexyl (meth)acrylate; (meth) acrylic oxaalkyl esters or oxacycloalkyl esters such as ethyltriglycol (meth)acrylate and methoxyoligoglycol (meth) acrylate having a molecular weight Mn of preferably 550, or other ethoxylated and/or propoxylated hydroxyl-free (meth)acrylic acid derivatives. These may contain minor amounts of (meth)acrylic alkyl or cycloalkyl esters of higher functionality, such as the di(meth)acrylates of ethylene glycol, propylene glycol, diethylene glycol, dipropylene glycol, butylene glycol, 1,5-pentanediol, 1,6-hexanediol, octahydro-4,7-methano-1H-indenedimethanol or 1,2-, 1,3- or 1,4-cyclohexanediol; trimethylolpropane di- or tri-(meth)acrylate; or pentaerythritol di-, tri- or tetra (meth)acrylate. For the purposes of the present invention, minor amounts of monomers of higher functionality in this case are to be understood as amounts which do not lead to crosslinking or gelling of the copolymers.

(a2) Monomers which carry per molecule at least one hydroxyl group, amino group, alkoxymethylamino group or imino group and are substantially free from acid groups, such as hydroxyalkyl esters of acrylic acid, methacrylic acid or another alpha,beta-olefinically unsaturated carboxylic acid, which derive from an alkylene glycol esterified with the acid, or which are obtainable by reacting the alpha,beta-olefinically unsaturated carboxylic acid with an alkylene oxide, especially hydroxyalkyl esters of acrylic acid, methacrylic acid, ethacrylic acid, crotonic acid, maleic acid, fumaric acid or itaconic acid in which the hydroxyalkyl group contains up to 20 carbon atoms, such as 2-hydroxyethyl, 2-hydroxypropyl, 3-hydroxypropyl, 3-hydroxybutyl, 4-hydroxybutyl acrylate, methacrylate, ethacrylate, crotonate, maleate, fumarate or itaconate; or hydroxycycloalkyl esters such as 1,4-bis(hydroxymethyl) cyclohexane, octahydro-4,7-methano-1H-indenedimethanol or methylpropanediol monoacrylate, monomethacrylate, monoethacrylate, monocrotonate, monomaleate, monofumarate or monoitaconate; or reaction products of cyclic esters, such as epsilon-caprolactone, for example, and these hydroxyalkyl or hydroxycycloalkyl esters; or olefinically unsaturated alcohols such as allyl alcohol or polyols such as tri-methylolpropane monoallyl or diallyl ether or pentaerythritol monoallyl, diallyl or triallyl ether (as far as these monomers (a2) of higher functionality are concerned, the comments made above relating to the monomers (a1) of higher functionality apply analogously); N,N-dimethylaminoethyl acrylate, N,N-diethylaminoethyl methacrylate, allylamine or N-methyliminoethyl acrylate or N,N-di(methoxymethyl)aminoethyl acrylate and methacrylate or N,N-di(butoxymethyl)aminopropyl acrylate and methacrylate.

(a3) Monomers which carry per molecule at least one acid group which can be converted to the corresponding acid anion group, such as acrylic acid, beta-carboxyethyl acrylate, methacrylic acid, ethacrylic acid, crotonic acid, maleic acid, fumaric acid or itaconic acid; olefinically unsaturated sulfonic or phosphonic acids or their partial esters; or mono(meth)acryloyloxyethyl maleate, succinate or phthalate.

(a4) Vinyl esters of alpha-branched monocarboxylic acids having 5 to 18 carbon atoms in the molecule. The branched monocarboxylic acids can be obtained by reacting formic acid or carbon monoxide and water with olefins in the presence of a liquid, strongly acidic catalyst; the olefins may be cracking products of paraffinic hydrocarbons, such as mineral oil fractions, and may comprise both branched and straight-chain acyclic and/or cycloaliphatic olefins. The reaction of such olefins with formic acid or, respectively, with carbon monoxide and water produces a mixture of carboxylic acids in which the carboxyl groups are located predominantly on a quaternary carbon atom. Examples of other olefinic starting materials are propylene trimer, propylene tetramer and diisobutylene. Alternatively, the vinyl esters (a4) may be prepared in a conventional manner from the acids, by reacting, for example, the acid with acetylene. Particular preference, owing to their ready availability, is given to using vinyl esters of saturated aliphatic monocarboxylic acids having 9 to 11 carbon atoms that are branched on the alpha carbon atom, but especially Versatic® acids.

(a5) Reaction products of acrylic acid and/or methacrylic acid with the glycidyl ester of an alpha-branched monocarboxylic acid having 5 to 18 carbon atoms per molecule, especially a Versatic® acid, or, instead of the reaction product, an equivalent amount of acrylic acid and/or methacrylic acid which is then reacted during or after the polymerization reaction with the glycidyl ester of an alpha-branched monocarboxylic acid having 5 to 18 carbon atoms per molecule, especially a Versatic® acid.

(a6) Cyclic and/or acyclic olefins such as ethylene, propylene, 1-butene, 1-pentene, 1-hexene, cyclohexene, cyclopentene, norbornene, butadiene, isoprene, cyclopentadiene and/or dicyclopentadiene.

(a7) (Meth)acrylamides such as (meth)acrylamide, N-methyl-, N,N-dimethyl-, N-ethyl-, N,N-diethyl-, N-propyl-, N,N-dipropyl-, N-butyl-, N,N-dibutyl-, N-cyclohexyl-, N,N-cyclohexylmethyl- and/or N-methylol-, N,N-dimethylol-, N-methoxymethyl-, N,N-di(methoxymethyl)-, N-ethoxymethyl- and/or N,N-di(ethoxyethyl)(meth)acrylamide. Monomers of the last-mentioned kind are used in particular to prepare self-crosslinking binders (A).

(a8) Monomers containing epoxide groups, such as the glycidyl ester of acrylic acid, methacrylic acid, ethacrylic acid, crotonic acid, maleic acid, fumaric acid and/or itaconic acid.

(a9) Vinylaromatic hydrocarbons such as styrene, alpha-alkylstyrenes, especially alpha-methylstyrene, and/or vinyltoluene; vinylbenzoic acid (all isomers), N,N-diethylaminostyrene (all isomers), alpha-methylvinylbenzoic acid (all isomers), N,N-diethylamino-alpha-methylstyrene (all isomers) and/or p-vinylbenzenesulfonic acid.

(a10) Nitriles such as acrylonitrile and/or methacrylonitrile.

(a11) Vinyl compounds, especially vinyl halides and/or vinylidene dihalides such as vinyl chloride, vinyl fluoride, vinylidene dichloride or vinylidene difluoride; N-vinylamides such as vinyl-N-methylformamide, N-vinylcaprolactam, 1-vinylimidazole or N-vinylpyrrolidone; vinyl ethers such as ethyl vinyl ether, n-propyl vinyl ether, isopropyl vinyl ether, n-butyl vinyl ether, isobutyl vinyl ether and/or vinyl cyclohexyl ether; and/or vinyl esters such as vinyl acetate, vinyl propionate, vinyl butyrate, vinyl pivalate and/or the vinyl ester of 2-methyl-2-ethyl-heptanoic acid.

(a12) Allyl compounds, especially allyl ethers and allyl esters such as allyl methyl, ethyl, propyl or butyl ether or allyl acetate, propionate or butyrate.

(a13) Polysiloxane macromonomers having a number-average molecular weight Mn of from 1000 to 40,000 and having on average from 0.5 to 2.5 ethylenically unsaturated double bonds per molecule; especially polysiloxane macromonomers having a number-average molecular weight Mn of from 2000 to 20,000, with particular preference from 2500 to 10,000 and, in particular, from 3000 to 7000 and having on average from 0.5 to 2.5, preferably from 0.5 to 1.5, ethylenically unsaturated double bonds per molecule, as are described in DE-A-38 07 571 on pages 5 to 7, in DE-A-37 06 095 in columns 3 to 7, in EP-B-0 358 153 on pages 3 to 6, in U.S. Pat. No. 4,754,014 in columns 5 to 9, in DE-A-44 21 823 or in the international patent application WO 92/22615 on page 12 line 18 to page 18 line 10.

(a14) Acryloxysilane-containing vinyl monomers, preparable by reacting hydroxy-functional silanes with epichlorohydrin and then reacting the reaction product with (meth)acrylic acid and/or with hydroxyalkyl and/or hydroxycycloalkyl esters of (meth)acrylic acid (cf. monomers a2).

Each of the abovementioned monomers (a1) to (a14) may be polymerized on their own with the monomers (b). In accordance with the invention, however, it is advantageous to use at least two monomers (a), in particular at least one monomer (a1) and at least one monomer (a3), since by this means it is possible to vary the profile of properties of the resulting copolymers very widely, in a particularly advantageous manner, and to tailor said profile of properties to the particular process of the invention. In particular, it is possible in this way to incorporate into the copolymers reactive functional groups by means of which the copolymers may be incorporated by crosslinking into the coatings, adhesive films, and seals produced from the powder slurries and powder coating materials of the invention.

Monomers (b) used comprise compounds of the general formula I.

In the general formula I, the radicals $R^1$, $R^2$, $R^3$ and $R^4$ each independently of one another are hydrogen atoms or substituted or unsubstituted alkyl, cycloalkyl, alkylcycloalkyl, cycloalkylalkyl, aryl, alkylaryl, cycloalkylaryl, arylalkyl or arylcycloalkyl radicals, with the proviso that at least two of the variables $R^1$, $R^2$ $R^3$ and $R^4$ are substituted or unsubstituted aryl, arylalkyl or arylcycloalkyl radicals, especially substituted or unsubstituted aryl radicals.

Examples of suitable alkyl radicals are methyl, ethyl, propyl, isopropyl, n-butyl, isobutyl, tert-butyl, amyl, hexyl or 2-ethylhexyl.

Examples of suitable cycloalkyl radicals are cyclobutyl, cyclopentyl or cyclohexyl.

Examples of suitable alkylcycloalkyl radicals are methylenecyclohexane, ethylenecyclohexane or propane-1,3-diylcyclohexane.

Examples of suitable cycloalkylalkyl radicals are 2-, 3- or 4-methyl-, -ethyl-, -propyl- or -butylcyclohex-1-yl.

Examples of suitable aryl radicals are phenyl, naphthyl or biphenylyl.

Examples of suitable alkylaryl radicals are benzyl or ethylene- or propane-1,3-diylbenzene.

Examples of suitable cycloalkylaryl radicals are 2-, 3- or 4-phenylcyclohex-1-yl.

Examples of suitable arylalkyl radicals are 2-, 3- or 4-methyl-, -ethyl-, -propyl- or -butylphen-1-yl.

Examples of suitable arylcycloalkyl radicals are 2-, 3- or 4-cyclohexylphen-1-yl.

The above-described radicals $R^1$, $R^2$, $R^3$ and $R^4$ may be substituted. The substituents used may comprise electron-withdrawing or electron-donating atoms or organic radicals.

Examples of suitable substituents are halogen atoms, especially chlorine and fluorine, nitrile groups, nitro groups, partially or fully halogenated, especially chlorinated and/or fluorinated, alkyl, cycloalkyl, alkylcycloalkyl, cycloalkylalkyl, aryl, alkylaryl, cycloalkylaryl, arylalkyl and arylcycloalkyl radicals, including those exemplified above, especially tert-butyl; aryloxy, alkyloxy and cycloalkyloxy radicals, especially phenoxy, naphthoxy, methoxy, ethoxy, propoxy, butyloxy or cyclohexyloxy; arylthio, alkylthio and cycloalkylthio radicals, especially phenylthio, naphthylthio, methylthio, ethylthio, propylthio, butylthio or cyclohexylthio; hydroxyl groups; and/or primary, secondary and/or tertiary amino groups, especially amino, N-methylamino, N-ethylamino, N-propylamino, N-phenylamino, N-cyclohexylamino, N,N-dimethylamino, N,N-diethylamino, N,N-dipropylamino, N,N-diphenylamino, N,N,-dicyclohexylamino, N-cyclohexyl-N-methylamino and N-ethyl-N-methylamino.

Examples of monomers (b) whose use is particularly preferred in accordance with the invention are diphenylethylene, dinaphthaleneethylene, cis- or trans-stilbene, vinylidenebis(4-N,N-dimethylaminobenzene), vinylidenebis(4-aminobenzene), and vinylidenebis(4-nitrobenzene).

In accordance with the invention, the monomers (b) may be used individually or as a mixture of at least two monomers (b).

In terms of the reaction regime and the properties of the resultant copolymers, especially the acrylate copolymers, diphenylethylene is of very particular advantage and is therefore used with very particular preference in accordance with the invention.

The monomers (a) and (b) to be used in accordance with the invention are reacted with one another in the presence of at least one free-radical initiator to form the copolymer. Examples of initiators which can be used are: dialkyl peroxides, such as di-tert-butyl peroxide or dicumyl peroxide; hydroperoxides, such as cumene hydroperoxide or tert-butyl hydroperoxide; peresters, such as tert-butyl perbenzoate, tert-butyl perpivalate, tert-butyl per-3,5,5-trimethylhexanoate or tert-butyl per-2-ethylhexanoate; potassium, sodium or ammonium peroxodisulfate; azo dinitriles such as azobisisobutyronitrile; C-C-cleaving initiators such as benzpinacol silyl ethers; or a combination of a nonoxidizing initiator with hydrogen peroxide.

It is preferred to add comparatively large amounts of free-radical initiator, the proportion of the initiator in the reaction mixture being, based in each case on the overall amount of the monomers (a) and of the initiator, with particular preference from 0.5 to 50% by weight, with very particular preference from 1 to 20% by weight, and in particular from 2 to 15% by weight.

Preferably, the weight ratio of initiator to the monomers (b) is from 4:1 to 1:4, with particular preference from 3:1 to 1:3, and in particular from 2:1 to 1:2. Further advantages result if the initiator is used in excess within the stated limits.

The free-radical copolymerization is preferably conducted in the apparatus mentioned below, especially stirred tanks or Taylor reactors, the Taylor reactors being designed such that the conditions of Taylor flow are met over the entire reactor length, even if the kinematic viscosity of the reaction medium alters greatly, and in particular increases, owing to the copolymerization.

The copolymerization is conducted in an aqueous medium.

The aqueous medium substantially comprises water. The aqueous medium may include minor amounts of the below-detailed additives and/or organic solvents and/or other dissolved solid, liquid or gaseous organic and/or inorganic substances of low and/or high molecular mass, provided these do not adversely affect, or even inhibit, the copolymerization. In the context of the present invention, a "minor amount" is to be understood as an amount which does not remove the aqueous character of the aqueous medium. Alternatively, the aqueous medium may comprise water alone.

The copolymerization is preferably conducted in the presence of at least one base. Particular preference is given to low molecular mass bases such as sodium hydroxide solution, potassium hydroxide solution, ammonia, diethanolamine, triethanolamine, mono-, di- and triethylamine, and/or dimethylethanolamine, especially ammonia and/or di- and/or triethanolamine.

The copolymerization is advantageously conducted at temperatures above room temperature and below the lowest decomposition temperature of the monomers used in each case, preference being given to a chosen temperature range of from 10 to 150° C., with very particular preference from 70 to 120° C., and in particular from 80 to 110° C.

When using particularly volatile monomers (a) and/or (b), the copolymerization may also be conducted under pressure, preferably under from 1.5 to 3000 bar, with particular preference from 5 to 1500 bar, and in particular from 10 to 1000 bar.

In terms of the molecular weight distributions, there are no restrictions whatsoever imposed on the copolymer. Advantageously, however, the copolymerization is conducted so as to give a molecular weight distribution Mw/Mn, measured by gel permeation chromatography using polystyrene as standard, of $\leq 4$, with particular preference $\leq 2$, and in particular $\leq 1.5$, and in certain cases even $\leq 1.3$. The molecular weights of the constituents (A) may be controlled within wide limits by the choice of ratio of monomer (a) to monomer (b) to free-radical initiator. In this context, the amount of monomer (b) in particular determines the molecular weight, specifically such that the higher the proportion of monomer (b), the lower the resultant molecular weight.

The copolymer resulting from the copolymerization is obtained as a mixture with the aqueous medium, generally in the form of a dispersion. In this form it can be used as an emulsifier directly or else isolated as a solid and then passed on for its inventive use.

The emulsifier may be introduced, in particular in the form of a solid, into the liquid starting products and/or, in particular in the form of a dispersion, into the aqueous media. Preferably it is introduced in the form of a dispersion into the aqueous media.

In one particularly preferred embodiment of the process of the invention, employed especially when preparing pigmented powder slurries and powder coating materials of the invention, the emulsifier for inventive use is introduced into the aqueous media by way of at least one of the pigment pastes or pigment preparations described below. Or else the pigment pastes or pigment preparations in question form the aqueous medium.

The amount of the emulsifiers for inventive use that is used in the inventive use and in the process of the invention may vary greatly and is guided by the requirements of each individual case. For instance, they may be used in the customary amounts known from the prior art for emulsifiers. They are preferably used in an amount of from 0.01 to 5.0, more preferably from 0.02 to 4.5, with particular preference from 0.03 to 4, with very particular preference from 0.04 to 3.5, and in particular from 0.05 to 3% by weight, based in each case on the amount of the melted or solid particles and of the emulsifiers for inventive use.

The starting products used in the process of the invention are selected with a view to the desired composition and curing mechanism of the powder slurry and powder coating materials of the invention.

The powder slurries and powder coating materials of the invention may be physically curing.

In the context of the present invention the term "physical curing" denotes the curing of a layer of particles of the powder slurry or the powder coating materials of the invention by filming, with linking within the coating taking place by looping of the polymer molecules of the binders (regarding the term cf. Römpp Lexikon Lacke und Druckfarben, Georg Thieme Verlag, Stuttgart, New York, 1998, "binders", pages 73 and 74). Or else filming takes place by way of the coalescence of binder particles (cf. Römpp Lexikon Lacke und Druckfarben, Georg Thieme Verlag, Stuttgart, New York, 1998, "curing", pages 274 and 275). Normally, no crosslinking agents are required for this purpose. If desired, physical curing may be assisted by atmospheric oxygen, by heat, or by exposure to actinic radiation.

The powder slurries and powder coating materials of the invention may be thermally curable. In this case they may be self-crosslinking or externally crosslinking.

In the context of the present invention the term "self-crosslinking" denotes the capacity of a binder to enter into crosslinking reactions with itself. A prerequisite for this is that the binders already contain both kinds of complementary reactive functional groups which are necessary for crosslinking. Externally crosslinking, on the other hand, is a term used to refer to those coating materials in which one kind of the complementary reactive functional groups is present in the binder and the other kind is present in a curing agent or crosslinking agent. For further details, refer to Römpp Lexikon Lacke und Druckfarben, Georg Thieme Verlag, Stuttgart, New York, 1998, "curing", pages 274 to 276, especially bottom page 275.

The powder slurries and powder coating materials of the invention may be curable with actinic radiation.

In this case curing takes place by way of groups containing bonds which can be activated with actinic radiation. In the context of the present invention, actinic radiation means electromagnetic radiation, such as visible light, UV radiation or X-rays, especially UV radiation, and corpuscular radiation such as electron beams.

The powder slurries and powder coating materials of the invention may be curable thermally and with actinic radiation.

Where thermal curing and curing with actinic light are employed together for one powder slurry or one powder coating material, the terms "dual cure" and "dual-cure powder coating material" and "dual-cure powder slurry" are also used.

The powder slurries and powder coating materials of the invention are preferably one-component (1K) systems.

In the context of the present invention, one-component (1K) systems are powder slurries and powder coating materials which cure thermally or both thermally and with actinic radiation and in which the binder and the crosslinking agent are present alongside one another in the suspended particles. A prerequisite for this is that the two constituents crosslink with one another only at relatively high temperatures and/or on exposure to actinic radiation.

The amount of dimensionally stable particles in the powder slurries of the invention may vary very widely and is guided by the requirements of each individual case. It is preferably from 5.0 to 60, more preferably from 10 to 55, with particular preference from 15 to 50, with very particular preference from 20 to 45, and in particular from 25 to 40% by weight, based in each case on the total amount of the powder slurry of the invention.

Similarly, the average particle size of the dimensionally stable particles of the powder slurries of the invention may vary widely. It is preferably between 0.1 and 100, more preferably between 0.2 and 80, with particular preference between 0.3 and 60, with very particular preference between 0.4 and 40, and in particular from 0.5 to 20 μm. For especially demanding end uses such as automotive OEM finishing, particle sizes of from 1 to 10 μm are especially advantageous.

The size of the dimensionally stable particles of the powder coating materials of the invention may likewise vary widely. It is preferably between 5 and 500, more preferably between 5 and 400, with particular preference between 5 and 300, with very particular preference between 10 and 200, and in particular between 10 and 100 μm. The average particle size is preferably from 10 to 300, more preferably from 10 to 200, with particular preference from 10 to 150, with very particular preference from 10 to 100, and in particular from 10 to 50 μm. The particle size distribution may be narrow or broad. In the majority of cases a narrow particle size distribution, as described in the patent applications and literature references EP 0 687 714 A1, DE 42 04 266 A1, DE 40 38 681 A1, P. G. de Lange and P. Selier, "Korngrößenverteilung und Eigenschaften von elektrostatischen Spritzpulvern (1)—Fraktionierung des Pulvers und Charakterisierung der Fraktionen" [Particle size distribution and properites of electrostatic spray powders (1)—fractionation of the powder and characterization of the fractions], Farbe und Lack [never names of journals], vol. 79, No. 5, 1973, pages 403 to 412, P. G. de Lange and P. Selier, "Korngrößenverteilung und Eigenschaften von elektrostatischen Spritzpulvern (2)—Verhalten der Pulverfraktionen beim Spritzen und nach dem Einbrennen" [Particle size distribution and properties of electrostatic spray powders (2)—powder fraction behavior during spraying and after baking], Farbe und Lack, vol. 79, No. 6, 1973, pages 509 to 517, and EP 0 536 791 A1, is of advantage.

In the context of the present invention, "dimensionally stable" means that under the customary and known conditions of the storage and application of powder coating materials or powder coating suspensions, the particles undergo little if any agglomeration and/or breakdown into smaller particles but instead substantially retain their original form even under the influence of shear forces. The particles may be highly viscous and/or solid. Preferably, the dimensionally stable particles are solid.

The powder slurries and powder coating materials of the invention are preferably free from volatile organic compounds (VOCs), especially from organic solvents (cosolvents). In the context of the present invention this means that they have a residual VOC content of <1% by weight, preferably <0.5% by weight, and with particular preference <0.2% by weight. In accordance with the invention it is of very particular advantage if the residual content is situated below the gas-chromatographic detection limit.

The process of the invention starts with the preparation of at least one liquid component comprising at least one liquid starting product of the powder slurries and powder coating materials of the invention. The starting product may already be liquid at room temperature or may only melt at higher temperatures. The essential factor is that the starting product is liquid at the process temperatures employed. Preferably, the starting product is solid at room temperature. In particular, this starting product comprises at least one binder.

The preparation of the liquid components has no special features in terms of its method but instead takes place using the customary and known techniques and apparatus for preparing melts, especially polymer melts, such as extruders, stirred tanks, Taylor reactors, tube reactors, loop reactors, etc., as described in the patent applications cited at the outset, for example.

The process temperatures are chosen so as not to exceed the decomposition temperature of the starting product which decomposes the most readily. Preference is given to employing process temperatures of from 50 to 250, preferably from 60 to 220, with particular preference from 70 to 200, with very particular preference from 80 to 190, and in particular from 90 to 180° C.

In the process of the invention, the liquid component(s) is or are then supplied to suitable mixing units, in which they are emulsified in an aqueous medium. The aqueous medium preferably includes the emulsifiers described above for inventive use.

In another variant of the process of the invention, at least two liquid components, each comprising at least one liquid starting product, are first supplied to a customary and known static mixer, and homogenized. Examples of suitable mixers are those of Sulzer type, sold by Sulzer Chemtech GmbH. The combined melts are then supplied to the mixing unit.

Preferably, the liquid components each have such high process temperatures that during the mixing operation one liquid component is not cooled by the other to such an extent that solid agglomerates are formed. On the other hand, the process temperatures of the liquid components must not be chosen to be so high that one liquid component is heated by the other to such an extent that, say, decomposition reactions occur. With particular preference, the liquid components have the same or approximately the same process temperature during the mixing operation.

Mixing units which are suitable for emulsifying liquid components in aqueous media are customary and known. Examples of suitable mixing units are inline dissolvers having a rotor/stator construction, preferably toothed-ring dispersing units particularly comprising at least one cylindrical arrangement of at least two comminutor rings (stator and rotor) which are seated on holders, are in mutual embrace, and are rotatable in opposite directions relative to one another, the working gap which results from the relative movement between stator and rotor having walls which extend nonparallelwise with respect to one another. In this case it is of advantage if the rotor rotates in the sense of an opening working gap. Examples of highly suitable toothed-ring dispersing units are described in detail in the patent EP 0 648 537 A1. They are sold under the trade name "K-Generatoren" by Kinematica AG, Lucerne, Switzerland.

Following emulsification, the resultant emulsified liquid particles are cooled, thereby giving suspended, dimensionally stable particles.

For the preparation of the powder slurry of the invention it is preferred to melt at least one binder and to supply it in the liquid state to a toothed-ring dispersing unit, in which it is emulsified in the aqueous medium.

The temperature of the melt(s) may vary very widely and is guided by the material composition of the binders. In general, temperatures are employed at which the binders are not thermally damaged. It is preferred to employ temperatures of from 110 to 200, more preferably from 115 to 180, and in particular from 120 to 160° C. In this context it should be ensured that in the course of the process of the invention the binder melts are cooled down again as rapidly as possible, in order to minimize the risk of thermal damage. The skilled worker will therefore be able to determine the temperature/time window that is suitable for the respective case in a simple manner on the basis of his or her general knowledge in the art, with or without the assistance of rangefinding tests.

If additionally at least one liquid crosslinking agent and/or at least one liquid additive is employed to prepare the powder slurry of the invention, all of the starting products are liquefied or melted separately from one another and supplied to the toothed-ring dispersing unit, in which they are emulsified in the aqueous medium.

As regards the temperature/time window employed in this case, the comment made above applies mutatis mutandis, with the further consideration that it is necessary to prevent the premature reaction of the binders with the crosslinking agents.

The emulsion is cooled rapidly following dispersion so that a suspension is formed. In this context it is preferred to employ the methods described in DE 196 52 813 A1, column 8 lines 9 to 17.

As a result of cooling, the liquid particles become dimensionally stable, thereby giving a suspension. If desired, the suspension or the powder slurry of the invention is wet-ground in an appropriate means, such as a stirred mill or laboratory mill, and is filtered prior to its application. The customary and known filtration apparatus and filters, as also suitable for filtering known powder slurries, are used for this purpose. The mesh size of the filters may vary widely and is guided primarily by the particle size and by the particle size distribution of the particles of the suspension. The skilled worker will therefore easily be able to determine the appropriate filters on the basis of this physical parameter. Examples of suitable filters are bag filters. These are available commercially under the brand names Pong® or Cuno®. It is preferred to use bag filters having mesh sizes of from 10 to 50 µm, examples being Pong® 10 to Pong® 50.

To prepare the powder coating materials of the invention, the suspended dimensionally stable particles are isolated. Viewed in terms of its method, the isolation has no special features but instead takes place by means of the customary and known apparatus and techniques, as employed, for example, in filtration, spray drying, or freeze drying. Highly suitable drying techniques are those using rotary atomizers, pressure atomizers or pneumatic atomizers, as described in the international patent application WO 99/01499, page 5 line 24 to page 7 line 27, and page 27 line 16 to page 28 line 19.

When preparing powder slurries and powder coating materials of the invention which can be crosslinked with actinic radiation, it is of advantage to work in the absence of actinic radiation.

The emulsified liquid particles and the suspended dimensionally stable particles comprise or consist of at least one binder.

The binder per se may be curable physically, thermally, with actinic radiation, and both thermally and with actinic radiation. In general it is present in the particles in an amount of from 5.0 to 100, preferably from 6.0 to 95, more preferably from 7.0 to 90, with particular preference from 8.0 to 85, with very particular preference from 9.0 to 80, and in particular from 10 to 80% by weight, based in each case on the total amount of the particles.

The binder preferably has a glass transition temperature that is above room temperature, more preferably from 30 to 80, with particular preference from 40 to 70, with very particular preference from 40 to 60, and in particular about 50° C. (measured by means of Differential Scanning Calorimetry (DSC)).

The molecular weight of the binder may vary very widely. In accordance with the invention it is preferred not to choose too high a binder molecular weight, since otherwise problems may occur in the course of its filming. Preferably, the molecular weight is from 500 to 30,000, more preferably from 500 to 25,000, with particular preference from 500 to 20,000, with very particular preference from 500 to 15,000, and in particular from 500 to 10,000.

The binders are oligomeric and polymeric resins. Oligomers are resins containing at least 2 to 15 monomer units in their molecule. In the context of the present invention, polymers are resins containing at least 10 repeating monomer units in their molecule. For further details of these terms, refer to Römpp Lexikon Lacke und Druckfarben, Georg Thieme Verlag, Stuttgart, New York, 1998, "oligomers", page 425.

It is of advantage if the minimum film formation temperature of the binders is in the region of their glass transition temperature Tg and in particular at at least 25° C. The minimum film formation temperature may be determined by drawing the aqueous dispersion of the binder down onto a glass plate using a coating bar and heating the drawdown in a gradient oven. The temperature at which the pulverulent layer forms a film is referred to as the minimum film formation temperature. For further details, refer to Römpp Lexikon Lacke und Druckfarben, Georg Thieme Verlag, Stuttgart, New York, 1998, "minimum film formation temperature", page 391.

Examples of suitable binders are random, alternating and/or block, linear and/or branched and/or comb addition (co)polymers of ethylenically unsaturated monomers, or polyaddition resins and/or polycondensation resins. Regarding these terms, refer to Römpp Lexikon Lacke und Druckfarben, Georg Thieme Verlag, Stuttgart, New York, 1998, page 457, "polyaddition" and "polyaddition resins (polyadducts)", pages 463 and 464, "polycondensates", "polycondensation" and "polycondensation resins", and also pages 73 and 74, "binders".

Examples of suitable addition (co)polymers are (meth)acrylate (co)polymers or partially saponified polyvinyl esters, especially (meth)acrylate copolymers.

Examples of suitable polyaddition resins and/or polycondensation resins are polyesters, alkyds, polyurethanes, polylactones, polycarbonates, polyethers, epoxy resin-amine adducts, polyureas, polyamides, polyimides, polyester-polyurethanes, polyether-polyurethanes or polyester-polyether-polyurethanes, especially polyester-polyurethanes.

Of these binders, the (meth)acrylate (co)polymers have particular advantages and are therefore used with particular preference.

The self-crosslinking binders of the thermally curable powder slurries and powder coating materials of the invention contain reactive functional groups which are able to enter into crosslinking reactions with groups of their own kind or with complementary reactive functional groups.

The externally crosslinking binders contain reactive functional groups which are able to enter into crosslinking reactions with complementary reactive functional groups that are present in crosslinking agents.

Examples of suitable complementary reactive functional groups for use in accordance with the invention are summarized in the following overview. In the overview, the variable R stands for an acyclic or cyclic aliphatic radical, an aromatic radical and/or an aromatic-aliphatic (araliphatic) radical; the variables R' and R" stand for identical or different aliphatic radicals or are linked with one another to form an aliphatic or heteroaliphatic ring.

| Overview: Examples of complementary functional groups Binder and crosslinking agent Or Crosslinking agent and binder | |
|---|---|
| —SH | —C(O)—OH |
| —NH$_2$ | —C(O)—O—C(O)— |
| —OH | —NCO |
| —O—(CO)—NH—(CO)—NH$_2$ | —NH—C(O)—OR |
| —O—(CO)—NH$_2$ | —CH$_2$—OH |

-continued

| Overview: Examples of complementary functional groups Binder and crosslinking agent Or Crosslinking agent and binder | |
|---|---|
| >NH | —CH$_2$—O—R<br>—NH—CH$_2$—O—R<br>—NH—CH$_2$—OH<br>—N(—CH$_2$—O—R)$_2$<br>—NH—C(O)—CH(—C(O)OR)$_2$<br>—NH—C(O)—CH(—C(O)OR)(—C(O)—R)<br>—NH—C(O)—NR'R"<br>>Si(OR)$_2$<br>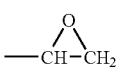 |
| —C(O)—OH | 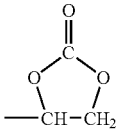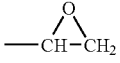<br>—C(O)—N(CH$_2$—CH$_2$—OH)$_2$ |

The selection of the respective complementary groups is guided on the one hand by the consideration that, during the preparation, storage, application, and melting of the powder slurries and powder coating materials of the invention, they should not enter into any unwanted reactions, particularly no premature crosslinking, and/or where appropriate, must not disrupt or inhibit curing with actinic radiation, and secondly by the temperature range within which crosslinking is to take place.

In the case of the powder slurries and powder coating materials of the invention, it is preferred to employ crosslinking temperatures from 60 to 180° C. It is therefore preferred to employ binders containing thio, hydroxyl, N-methylolamino, N-alkoxymethylamino, imino, carbamate, allophanate and/or carboxyl groups, preferably hydroxyl or carboxyl groups, on the one hand, and preferred to employ crosslinking agents containing anhydride, carboxyl, epoxy, blocked isocyanate, urethane, methylol, methylol ether, siloxane, carbonate, amino, hydroxyl and/or beta-hydroxyalkyl amide groups, preferably epoxy, beta-hydroxyalkylamide, blocked isocyanate, urethane or alkoxymethylamino groups, on the other.

In the case of self-crosslinking powder slurries and powder coating materials of the invention, the binders include in particular methylol, methylol ether and/or N-alkoxymethylamino groups.

Complementary reactive functional groups particularly suitable for use in the powder slurries and powder coating materials of the invention are
    carboxyl groups on the one hand and epoxide groups and/or beta-hydroxyalkylamide groups on the other, and
    hydroxyl groups on the one hand and blocked isocyanate, urethane or alkoxymethylamino groups on the other.

The functionality of the binders in respect of the reactive functional groups described above may vary very widely and is guided in particular by the desired crosslinking density and/or by the functionality of the crosslinking agents employed in each case. In the case of carboxyl-containing binders, for example, the acid number is preferably from 10 to 100, more preferably from 15 to 80, with particular preference from 20 to 75, with very particular preference from 25 to 70, and, in particular, from 30 to 65 mg KOH/g. Alternatively, in the case of hydroxyl-containing binders, the OH number is preferably from 15 to 300, more preferably from 20 to 250, with particular preference from 25 to 200, with very particular preference from 30 to 150, and, in particular, from 35 to 120 mg KOH/g. Alternatively, in the case of binders containing epoxide groups, the epoxide equivalent weight is preferably from 400 to 2500, more preferably from 420 to 2200, with particular preference from 430 to 2100, with very particular preference from 440 to 2000, and, in particular, from 440 to 1900.

The complementary functional groups described above can be incorporated into the binders in accordance with the customary and known methods of polymer chemistry. This can be done, for example, by incorporating monomers which carry the corresponding reactive functional groups, and/or with the aid of polymer-analogous reactions.

Examples of suitable olefinically unsaturated monomers containing reactive functional groups are the monomers (a) described above, especially
    (i) monomers which carry at least one hydroxyl, amino, alkoxymethylamino, carbamate, allophanate or imino group per molecule, such as
        hydroxyalkyl esters of acrylic acid, methacrylic acid or another alpha,beta-olefinically unsaturated carboxylic acid, which are derived from an alkylene glycol which is esterified with the acid, or which are obtainable by reacting the alpha,beta-olefinically unsaturated carboxylic acid with an alkylene oxide such as ethylene oxide or propylene oxide, especially hydroxyalkyl esters of acrylic acid, methacrylic acid, ethacrylic acid, crotonic acid, maleic acid, fumaric acid or itaconic acid, in which the hydroxyalkyl group contains up to 20 carbon atoms, such as 2-hydroxyethyl, 2-hydroxypropyl, 3-hydroxypropyl, 3-hydroxybutyl, 4-hydroxybutyl acrylate, methacrylate, ethacrylate, crotonate, maleate, fumarate or itaconate; or hydroxycycloalkyl esters such as 1,4-bis(hydroxymethyl)cyclohexane, octahydro-4,7-methano-1H-indenedimethanol or methylpropanediol monoacrylate, monomethacrylate, monoethacrylate, monocrotonate, monomaleate, monofumarate or monoitaconate; reaction products of cyclic esters, such as epsilon-caprolactone and these hydroxyalkyl or hydroxycycloalkyl esters;
        olefinically unsaturated alcohols such as allyl alcohol;
        polyols such as trimethylolpropane monoallyl or diallyl ether or pentaerythritol monoallyl, diallyl or triallyl ether;
        reaction products of acrylic acid and/or methacrylic acid with the glycidyl ester of an alpha-branched monocarboxylic acid having 5 to 18 carbon atoms per molecule, especially a Versatic® acid, or instead of the reaction product an equivalent amount of acrylic and/or methacrylic acid, which is then reacted during or after the polymerization reaction with the glycidyl ester of an alpha-branched monocarboxylic acid having 5 to 18 carbon atoms per molecule, especially a Versatic® acid;
        aminoethyl acrylate, aminoethyl methacrylate, allylamine or N-methyliminoethyl acrylate;
        N,N-di(methoxymethyl)aminoethyl acrylate or methacrylate or N,N-di(butoxymethyl)aminopropyl acrylate or methacrylate;

(meth)acrylamides such as (meth)acrylamide, N-methyl-, N-methylol-, N,N-dimethylol-, N-methoxymethyl-, N,N-di(methoxymethyl)-, N-ethoxymethyl- and/or N,N-di(ethoxyethyl)(meth)acrylamide;

acryloyloxy- or methacryloyloxyethyl, -propyl or -butyl carbamate or allophanate; further examples of suitable monomers containing carbamate groups are described in the patents U.S. Pat. Nos. 3,479,328, 3,674,838, 4,126,747, 4,279,833 and 4,340,497;

(ii) monomers which carry at least one acid group per molecule, such as acrylic acid, beta-carboxyethyl acrylate, methacrylic acid, ethacrylic acid, crotonic acid, maleic acid, fumaric acid or itaconic acid;

olefinically unsaturated sulfonic or phosphonic acids or their partial esters;

mono(meth)acryloyloxyethyl maleate, succinate or phthalate; or vinylbenzoic acid (all isomers), alpha-methylvinylbenzoic acid (all isomers) or vinylbenzenesulfonic acid (all isomers);

(iii) monomers containing epoxide groups, such as the glycidyl ester of acrylic acid, methacrylic acid, ethacrylic acid, crotonic acid, maleic acid, fumaric acid or itaconic acid, or allyl glycidyl ether.

They are preferably used to prepare the inventively preferred (meth)acrylate copolymers, especially the ones containing glycidyl groups.

More highly functional monomers of the type described above are generally used in minor amounts. For the purposes of the present invention, minor amounts of higher-functional monomers are those amounts which do not lead to crosslinking or gelling of the addition copolymers, in particular of the (meth)acrylate copolymers, unless the specific desire is to prepare crosslinked polymeric microparticles.

Examples of suitable monomer units for introducing reactive functional groups into polyesters or polyester-polyurethanes are 2,2-dimethylolethyl- or -propylamine blocked with a ketone, the resulting ketoxime group being hydrolyzed again following incorporation; or compounds containing two hydroxyl groups or two primary and/or secondary amino groups and also at least one acid group, in particular at least one carboxyl group and/or at least one sulfonic acid group, such as dihydroxypropionic acid, dihydroxysuccinic acid, dihydroxybenzoic acid, 2,2-dimethylolacetic acid, 2,2-dimethylolpropionic acid, 2,2-dimethylolbutyric acid, 2,2-dimethylolpentanoic acid, 2,2-diaminovaleric acid, 3,4-diaminobenzoic acid, 2,4-diaminotoluenesulfonic acid or 2,4-diaminodiphenyl ether sulfonic acid.

One example of introducing reactive functional groups by way of polymer-analogous reactions is the reaction of hydroxyl-containing resins with phosgene, resulting in resins containing chloroformate groups, and the polymer-analogous reaction of the chloroformate-functional resins with ammonia and/or primary and/or secondary amines to give resins containing carbamate groups. Further examples of suitable methods of this kind are known from the patents U.S. Pat. Nos. 4,758,632 A1, 4,301,257 A1 and 2,979,514 A1. Moreover, it is possible to introduce carboxyl groups by polymer-analogous reaction of hydroxyl groups with carboxylic anhydrides, such as maleic anhydride or phthalic anhydride.

The binders of the dual-cure powder slurries and powder coating materials of the invention further comprise on average per molecule at least one, preferably at least two, group(s) having at least one bond that can be activated with actinic radiation.

For the purposes of the present invention, a bond that can be activated with actinic radiation is a bond which on exposure to actinic radiation becomes reactive and, with other activated bonds of its kind, enters into addition polymerization reactions and/or crosslinking reactions which proceed in accordance with free-radical and/or ionic mechanisms. Examples of suitable bonds are carbon-hydrogen single bonds or carbon-carbon, carbon-oxygen, carbon-nitrogen, carbon-phosphorus or carbon-silicon single bonds or double bonds. Of these, the carbon-carbon double bonds are particularly advantageous and are therefore used with very particular preference in accordance with the invention. For the sake of brevity, they are referred to below as "double bonds".

Accordingly, the group which is preferred in accordance with the invention comprises one double bond or two, three or four double bonds. If more than one double bond is used, the double bonds can be conjugated. In accordance with the invention, however, it is of advantage if the double bonds are present in isolation, in particular each being present terminally, in the group in question. It is of particular advantage in accordance with the invention to use two double bonds or, in particular, one double bond.

The dual-cure binder contains on average at least one of the above-described groups that can be activated with actinic radiation. This means that the functionality of the binder in this respect is integral, i.e., for example, is two, three, four, five or more, or nonintegral, i.e., for example, is from 2.1 to 10.5 or more. The functionality chosen depends on the requirements imposed on the respective pigmented dual-cure powder slurries and powder coating materials of the invention.

If more than one group that can be activated with actinic radiation is used on average per molecule, the groups are structurally different from one another or of the same structure.

If they are structurally different from one another, this means, in the context of the present invention, that use is made of two, three, four or more, but especially two, groups that can be activated by actinic radiation, these groups deriving from two, three, four or more, but especially two, monomer classes.

Examples of suitable groups are (meth)acrylate, ethacrylate, crotonate, cinnamate, vinyl ether, vinyl ester, dicyclopentadienyl, norbornenyl, isoprenyl, isopropenyl, allyl or butenyl groups; dicyclopentadienyl, norbornenyl, isoprenyl, isopropenyl, allyl or butenyl ether groups; or dicyclopentadienyl, norbornenyl, isoprenyl, isopropenyl, allyl or butenyl ester groups, but especially acrylate groups.

Preferably, the groups are attached to the respective parent structures of the binders via urethane, urea, allophanate, ester, ether and/or amide groups, but in particular via ester groups. Normally, this occurs as a result of customary and known polymer-analogous reactions such as, for instance, the reaction of pendant glycidyl groups with the olefinically unsaturated monomers described above that contain an acid group, of pendant hydroxyl groups with the halides of these monomers, of hydroxyl groups with isocyanates containing double bonds such as vinyl isocyanate, methacryloyl isocyanate and/or 1-(1-isocyanato-1-methylethyl)-3-(1-methylethenyl)benzene (TMI® from the company CYTEC), or of isocyanate groups with the above-described hydroxyl-containing monomers.

Alternatively, in the particles, it is possible to employ mixtures of purely thermally curable binders and binders that are curable purely with actinic radiation.

The material composition of the binders does not basically have any special features; rather, suitable binders include all the binders envisaged for use in powder clearcoat slurries curable thermally and/or with actinic radiation that are described in the U.S. Pat. Nos. 4,268,542 A1 or 5,379,947 A1 and in the patent applications DE 27 10 421 A1, DE 195 40 977 A1, DE 195 18 392 A1, DE 196 17 086 A1, DE 196 13 547 A1, DE 196 18 657 A1, DE 196 52 813 A1, DE 196 17 086 A1, DE 198 14 471 A1, DE 198 41 842 A1 or DE 198 41 408 A1, in the German patent applications DE 199 08 018.6 or DE 199 08 013.5, unpublished at the priority date of the present specification, or in the European patent EP 0 652 264 A1;

all the binders envisaged for use in dual-cure clearcoats that are described in the patent applications DE 198 35 296 A1, DE 197 36 083 A1 or DE 198 41 842 A1; or all the binders envisaged for use in thermally curable powder clearcoats and described in the German patent application DE 42 22 194 A1, in the product information bulletin from BASF Lacke+Farben AG, "Pulverlacke" [Powder coating materials], 1990, or in the BASF Coatings AG brochure "Pulverlacke, Pulverlacke für industrielle Anwendungen" [Powder coating materials, powder coatings for industrial applications], January 2000.

Suitable additional binders for the dual-cure powder slurries and powder coating materials, are the binders envisaged for use in UV-curable clearcoats and powder clearcoats and described in the European patent applications EP 0 928 800 A1, EP 0 636 669 A1, EP 0 410 242 A1, EP 0 783 534 A1, EP 0 650 978 A1, EP 0 650 979 A1, EP 0 650 985 A1, EP 0 540 884 A1, EP 0 568 967 A1, EP 0 054 505 A1 or EP 0 002 866 A1, in the German patent applications DE 197 09 467 A1, DE 42 03 278 A1, DE 33 16 593 A1, DE 38 36 370 A1, DE 24 36 186 A1 or DE 20 03 579 B1, in the international patent applications WO 97/46549 or WO 99/14254, or in the American patents U.S. Pat. Nos. 5,824,373 A1, 4,675,234 A1, 4,634,602 A1, 4,424,252 A1, 4,208,313 A1, 4,163,810 A1, 4,129,488 A1, 4,064,161 A1 or 3,974,303 A1.

The preparation of the binders also has no special features in terms of its method but instead takes place by means of the customary and known methods of polymer chemistry, as described in detail, for example, in the patents listed above.

Further examples of suitable preparation processes for (meth)acrylate copolymers are described in the European patent application EP 0 767 185 A1, in the German patents DE 22 14 650 B1 and DE 27 49 576 B1, and in the American patents U.S. Pat. Nos. 4,091,048 A1, 3,781,379 A1, 5,480, 493 A1, 5,475,073 A1, and 5,534,598 A1, or in the standard work Houben-Weyl, Methoden der organischen Chemie, 4th Edition, volume 14/1, pages 24 to 255, 1961. Suitable reactors for the copolymerization include the customary and known stirred tanks, stirred tank cascades, tube reactors, loop reactors or Taylor reactors, as described for example in the patents and patent applications DE 1 071 241 B1, EP 0 498 583 A1, and DE 198 28 742 A1 or in the article by K. Kataoka in Chemical Engineering Science 50 (9) 1995, pages 1409 to 1416.

The preparation of polyesters and alkyd resins is also described, for example, in the standard work Ullmanns Encyklopädie der technischen Chemie, 3rd edition, volume 14, Urban & Schwarzenberg, Munich, Berlin, 1963, pages 80 to 89 and pages 99 to 105, and also in the following books: "Résines Alkydes-Polyesters" by J. Bourry, Dunod, Paris, 1952, "Alkyd Resins" by C. R. Martens, Reinhold Publishing Corporation, New York, 1961, and also "Alkyd Resin Technology" by T. C. Patton, Interscience Publishers, 1962.

The preparation of polyurethanes and/or acrylated polyurethanes is also described, for example, in the patent applications EP 0 708 788 A1, DE 44 01 544 A1, and DE 195 34 361 A1.

Of these binders, the (meth)acrylate copolymers containing epoxide groups, having an epoxide equivalent weight of preferably from 400 to 2500, more preferably from 420 to 2200, with particular preference from 430 to 2100, with very particular preference from 440 to 2000, and, in particular, from 440 to 1900, a number-average molecular weight (determined by gel permeation chromatography using a polystyrene standard) of preferably from 2000 to 20,000 and in particular from 3000 to 10,000, and a glass transition temperature (Tg) of preferably from 30 to 80, more preferably from 40 to 70 and in particular from 40 to 60° C. (measured by means of differential scanning calorimetry (DSC), as suitable in particular for use in thermally curable powder clearcoat slurries (see above) and as described, furthermore, in the patents and patent applications EP 0 299 420 A1, DE 22 14 650 B1, DE 27 49 576 B1, U.S. Pat. Nos. 4,091,048 A1 and 3,781,379 A1, are particularly advantageous and are used with particular preference.

The externally crosslinking powder coating materials and powder slurries of the invention which are curable thermally or both thermally and with actinic radiation, and/or the particles used for their preparation, comprise at least one crosslinking agent which contains reactive functional groups that are complementary to the reactive functional groups of the binders. The skilled worker will therefore be able easily to select the crosslinking agents suitable for the case in hand.

Examples of suitable crosslinking agents are amino resins, as described for example in Römpp Lexikon Lacke und Druckfarben, Georg Thieme Verlag, 1998, page 29, "amino resins", in the textbook "Lackadditive" [Additives for coatings] by Johan Bieleman, Wiley-VCH, Weinheim, New York, 1998, pages 242 ff., in the book "Paints, Coatings and Solvents", second, completely revised edition, edited by D. Stoye and W. Freitag, Wiley-VCH, Weinheim, New York, 1998, pages 80 ff., in the patents U.S. Pat. No. 4,710,542 A1, and EP 0 245 700 A1, and in the article by B. Singh and coworkers, "Carbamylmethylated Melamines, Novel Crosslinkers for the Coatings Industry", in Advanced Organic Coatings Science and Technology Series, 1991, Volume 13, pages 193 to 207;

carboxyl-containing compounds or resins, as described for example in the patent DE 196 52 813 A1 or 198 41 408 A1, especially 1,12-dodecanedioic acid (1,10-decanedicarboxylic acid);

resins or compounds containing epoxide groups, as described for example in the patents EP 0 299 420 A1, DE 22 14 650 B1, DE 27 49 576 B1, U.S. Pat. Nos. 4,091,048 A1, and 3,781,379 A1;

blocked polyisocyanates, as described for example in the U.S. Pat. No. 4,444,954 A1, DE 196 17 086 A1, DE 196 31 269 A1, EP 0 004 571 A1, and EP 0 582 051 A1;

beta-hydroxyalkylamides such as N,N,N',N'-tetrakis(2-hydroxyethyl)adipamide or N,N,N',N'-tetrakis(2-hydroxypropyl)adipamide; and/or tris(alkoxycarbonylamino)triazines, as described in the patents U.S. Pat. Nos. 4,939,213 A1, 5,084,541 A1, 5,288,865 A1 and EP 0 604 922 A1.

The amount of the crosslinking agents in the particles may likewise vary very widely and is guided by the requirements of the case in hand, in particular with the number of reactive functional groups present and by the target crosslinking density of the coatings, adhesive films, and seals produced from the powder slurries and powder coating materials of the invention. Preferably the amount is from 1 to 50, more preferably from 2 to 45, with particular preference from 3 to 40, with very particular preference from 4 to 35, and in particular from 5 to 30% by weight, based on the solids of the powder slurries and powder coating materials of the invention.

Depending on the intended use of the powder slurries and powder coating materials of the invention, they may comprise color and/or effect pigments, fluorescent pigments, electrically conductive pigments and/or magnetically shielding pigments, metal powders, organic and inorganic, transparent or opaque fillers, and/or nanoparticles ("pigments" collectively below).

The pigments are used when the powder slurries and powder coating materials of the invention are intended for use as pigmented coating materials, adhesives, and sealing compounds. In the process of the invention they are preferably dispersed in the form of pigment pastes or pigment preparations (cf. Römpp Lexikon Lacke und Druckfarben, Georg Thieme Verlag, Stuttgart, New York, 1998, "pigment preparations", page 452) into the aqueous media or, as already mentioned above, they form the aqueous media. Preferably, they comprise the emulsifiers for inventive use described above.

In one embodiment of the process of the invention, the emulsified or suspended particles comprise at least one pigment; i.e., the total amount of the pigments used is present on and/or in the particles.

In another embodiment of the process of the invention, the emulsified or suspended particles contain no pigment; i.e., all of the pigments are present in the form of a separate solid phase. Regarding their particle size, the comments made above apply analogously.

In yet another embodiment of the process of the invention, the emulsified or suspended particles comprise, in the sense set out above, a portion of the pigments used, while the other portion of the pigments is present in the form of a separate solid phase. In this case, the fraction present in the particles may comprise the majority, i.e., more than 50%, of the pigments used. It is, however, also possible for less than 50% to be present in and/or on the particles. Regarding the particle sizes, the comments made above apply analogously here as well.

Which variant of the process of the invention is given preference in preparing the pigmented powder slurries of the invention depends in particular on the nature of the pigments and their functions. Where the process of the invention is used to prepare the pigmented powder coating materials of the invention, preference is given to employing the advantageous variant in which all, or the predominant fraction, of the pigments are/is present on and/or in the emulsified and suspended particles.

Examples of suitable effect pigments are metal flake pigments such as commercially customary aluminum bronzes, aluminum bronzes chromated in accordance with DE 36 36 183 A1, and commercially customary stainless steel bronzes, and also nonmetallic effect pigments, such as pearlescent pigments and interference pigments, for example, platelet-shaped effect pigments based on iron oxide which has a shade ranging from pink to brownish red, or liquid-crystalline effect pigments. For further details, reference is made to Römpp Lexikon Lacke und Druckfarben, Georg Thieme Verlag, 1998, page 176, "effect pigments" and pages 380 and 381, "metal oxide-mica pigments" to "metal pigments", and to the patent applications and patents DE 36 36 156 A1, DE 37 18 446 A1, DE 37 19 804 A1, DE 39 30 601 A1, EP 0 068 311 A1, EP 0 264 843 A1, EP 0 265 820 A1, EP 0 283 852 A1, EP 0 293 746 A1, EP 0 417 567 A1, U.S. Pat. Nos. 4,828,826 A, and 5,244,649 A.

Examples of suitable inorganic color pigments are white pigments such as titanium dioxide, zinc white, zinc sulfide or lithopones; black pigments such as carbon black, iron manganese black or spinel black; chromatic pigments such as chromium oxide, chromium oxide hydrate green, cobalt green or ultramarine green, cobalt blue, ultramarine blue or manganese blue, ultramarine violet or cobalt violet and manganese violet, red iron oxide, cadmium sulfoselenide, molybdate red or ultramarine red; brown iron oxide, mixed brown, spinel phases and corundum phases or chrome orange; or yellow iron oxide, nickel titanium yellow, chrome titanium yellow, cadmium sulfide, cadmium zinc sulfide, chrome yellow or bismuth vanadate.

Examples of suitable organic color pigments are monoazo pigments, disazo pigments, anthraquinone pigments, benzimidazole pigments, quinacridone pigments, quinophthalone pigments, diketopyrrolopyrrole pigments, dioxazine pigments, indanthrone pigments, isoindoline pigments, isoindolinone pigments, azomethine pigments, thioindigo pigments, metal complex pigments, perinone pigments, perylene pigments, phthalocyanine pigments or aniline black.

For further details, reference is made to Römpp cit., pages 180 and 181, "iron blue pigments" to "black iron oxide", pages 451 to 453, "pigments" to "pigment volume concentration", page 563, "thioindigo pigments", page 567, "titanium dioxide pigments", pages 400 and 467, "naturally occurring pigments", page 459 "polycyclic pigments", page 52, "azomethine pigments", "azo pigments", and page 379, "metal complex pigments".

Examples of (daylight-)fluorescent pigments are bis (azomethine) pigments.

Examples of suitable electrically conductive pigments are titanium dioxide/tin oxide pigments.

Examples of magnetically shielding pigments are pigments based on iron oxides or chromium dioxide.

Examples of suitable metal powders are powders of metals and metal alloys comprising aluminum, zinc, copper, bronze or brass.

Examples of suitable organic and inorganic fillers are chalk, calcium sulfates, barium sulfate, silicates such as talc, mica or kaolin, silicas, oxides such as aluminum hydroxide or magnesium hydroxide, or organic fillers such as polymer powders, especially polyacrylonitrile powder or polyamide powder. For further details, reference is made to Römpp Lexicon Lacke und Druckfarben, Georg Thieme Verlag, 1998, pages 250 ff., "fillers".

Preference is given to employing mica and talc when the intention is to improve the scratch resistance of the coatings produced from the powder coating materials of the invention.

Moreover, it is advantageous to use mixtures of platelet-shaped inorganic fillers such as talc or mica and non-platelet shaped inorganic fillers such as chalk, dolomite, calcium sulfates or barium sulfate, since by this means the viscosity and rheology may be adjusted very effectively.

Examples of suitable transparent fillers are those based on silica, alumina or zirconium oxide.

Suitable nanoparticles are selected from the group consisting of hydrophilic and hydrophobic, especially hydrophilic, nanoparticles based on silica, alumina, zinc oxide, zirconium oxide, and the polyacids and heteropolyacids of transition metals, preferably of molybdenum and tungsten, having a primary particle size <50 nm, preferably from 5 to 50 nm, in particular from 10 to 30 nm. Preferably, the hydrophilic nanoparticles have no flatting effect. Particular preference is given to using nanoparticles based on silica.

Very particular preference is given to using hydrophilic pyrogenic silicas whose agglomerates and aggregates have a catenated structure, and which are preparable by the flame hydrolysis of silicon tetrachloride in an oxyhydrogen flame. They are sold, for example, by Degussa under the brand name Aerosil®. Very particular preference is also given to using precipitated waterglasses, such as nanohectorites, which are sold, for example, by Südchemie under the brand name Optigel® or by Laporte under the brand name Laponite®.

When the above-described emulsifiers for inventive use are used, the pigment pastes or pigment preparations may have a particularly high nanoparticle content, which is a further valuable advantage of the emulsifiers for inventive use.

In addition to the above-described pigments, or instead of them, the powder slurries and powder coating materials of the invention may comprise molecularly dispersed organic dyes. These molecularly dispersed dyes may be present either in the emulsified or suspended particles or in the continuous phase, i.e., the aqueous medium. Alternatively, they may be present in the particles and in the continuous phase. In this case, the fraction that is present in the particles may comprise the majority, i.e., more than 50%, of the organic dyes used. However, less than 50% may be present, alternatively, in the particles. The distribution of the organic dyes between the phases may correspond to the thermodynamic equilibrium resulting from the solubility of the organic dyes in the phases. However, the distribution may also be far removed from the thermodynamic equilibrium. Where the emulsified and suspended particles are used to prepare the powder coating materials of the invention, the dyes are present only in the particles.

Suitable organic dyes are all those soluble in the sense outlined above in the powder slurries and powder coating materials of the invention. Lightfast organic dyes are highly suitable. Lightfast organic dyes having little or no tendency to migrate from the coatings, adhesive films, and seals produced from the powder slurries and powder coating materials of the invention are especially suitable. The migration tendency may be estimated by the skilled worker on the basis of his or her general knowledge of the art and/or determined with the aid of simple preliminary rangefinding tests, as part of tinting tests, for example.

The amount of the molecularly dispersed organic dyes in the powder slurries and powder coating materials of the invention may vary extremely widely and is guided primarily by the color and by the shade that is to be established, and also by the amount of any pigments present.

Examples of suitable additives which may be present in both the pigmented and the unpigmented powder slurries and powder coating materials are UV absorbers, antioxidants, light stabilizers, free-radical scavengers, devolatilizers, additional emulsifiers, wetting agents, slip additives, polymerization inhibitors, crosslinking catalysts, thermolabile free-radical initiators, photoinitiators, thermally curable reactive diluents, reactive diluents curable with actinic radiation, adhesion promoters, leveling agents, rheology control additives (thickeners), film-forming auxiliaries, flame retardants, corrosion inhibitors, free-flow aids, waxes, siccatives, biocides and/or flatting agents.

Examples of suitable thermally curable reactive diluents are positionally isomeric diethyloctanediols or hydroxyl-containing hyperbranched compounds or dendrimers, as described in the German patent applications DE 198 09 643 A1, DE 198 40 605 A1 and DE 198 05 421 A1.

Examples of suitable reactive diluents curable with actinic radiation are those described in Römpp Lexikon Lacke und Druckfarben, Georg Thieme Verlag, Stuttgart, New York, 1998, on page 491 under the entry on "reactive diluents".

Examples of suitable light stabilizers are HALS compounds, benzotriazoles or oxalanilides.

Examples of suitable antioxidants are hydrazines and phosphorus compounds.

Examples of suitable polymerization inhibitors are organic phosphites or 2,6-di-tert-butylphenol derivatives.

Examples of suitable thermolabile free-radical initiators are dialkyl peroxides, hydroperoxides, peresters, azo dinitriles or C-C-cleaving initiators.

Examples of suitable photoinitiators are described in Römpp Chemie Lexikon, 9th, expanded and revised edition, Georg Thieme Verlag, Stuttgart, Vol. 4, 1991, or in Römpp Lexikon Lacke und Druckfarben, Georg Thieme Verlag, Stuttgart, 1998, pages 444 to 446.

Examples of suitable crosslinking catalysts are bismuth lactate, citrate, ethylhexanoate or dimethylolpropionate, dibutyltin dilaurate, lithium decanoate or zinc octoate, amine-blocked organic sulfonic acids, quaternary ammonium compounds, amines, imidazole and imidazole derivatives such as 2-styrylimidazole, 1-benzyl-2-methylimidazole, 2-methylimidazole and 2-butylimidazole, as described in the Belgian patent no. 756,693, or phosphonium catalysts such as ethyltriphenylphosphonium iodide, ethyltriphenylphosphonium chloride, ethyltriphenylphosphonium thiocyanate, ethyltriphenylphosphonium acetate-acetic acid complex, tetrabutylphosphonium iodide, tetrabutylphosphonium bromide and tetrabutylphosphonium acetate-acetic acid complex, as described, for example, in the U.S. Pat. Nos. 3,477, 990 A or 3,341,580 A.

Examples of suitable devolatilizers are diazadicycloundecane or benzoin.

Examples of suitable additional emulsifiers are nonionic emulsifiers, such as alkoxylated alkanols and polyols, phenols and alkylphenols, or anionic emulsifiers such as alkali metal salts or ammonium salts of alkanecarboxylic acids, alkanesulfonic acids, and sulfo acids of alkoxylated alkanols and polyols, phenols and alkylphenols.

Examples of suitable wetting agents are siloxanes, fluorine compounds, carboxylic monoesters, phosphates, polyacrylic acids and their copolymers, or polyurethanes.

An example of a suitable adhesion promoter is tricyclodecanedimethanol.

Examples of suitable film-forming auxiliaries are cellulose derivatives.

Examples of suitable rheology control additives (thickeners) are those known from the patents WO 94/22968, EP 0 276 501 A1, EP 0 249 201 A1, and WO 97/12945; crosslinked polymeric microparticles, as disclosed for example in EP 0 008 127 A1; inorganic phyllosilicates such as aluminum magnesium silicates, sodium magnesium phyllosilicates and sodium magnesium fluorine lithium phyllosilicates of the montmorillonite type; silicas such as Aerosils; or synthetic polymers containing ionic and/or associative groups such as polyvinyl alcohol, poly(meth)acrylamide, poly(meth)acrylic acid, polyvinylpyrrolidone, styrene-maleic anhydride or ethylene-maleic anhydride copolymers and their derivatives, or hydrophobically modified ethoxylated urethanes, as described for example in the patent DE 196 52 813 A1, column 5 lines 28 to 59, or polyacrylates.

An example of a suitable flatting agent is magnesium stearate.

Further examples of the additives listed above and also of suitable leveling agents, flame retardants, siccatives, dryers, antiskinning agents, corrosion inhibitors, biocides, and waxes are described in detail in the textbook "Lackadditive" [Additives for coatings] by Johan Bieleman, Wiley-VCH, Weinheim, New York, 1998.

Further suitable additives include low-boiling and high-boiling ("long") organic solvents, as commonly used in the field of coating materials. In view of the fact that the powder slurries and powder coating materials of the invention are preferably free of VOCs, the organic solvents are used only in exceptional cases.

For the process of the invention, the additives described above may be used either in the aqueous media described above or in the melts described above. The governing factor above all is whether they are to be present more effectively, depending on their customary and known functions, in the emulsified or suspended particles or in the continuous, i.e., aqueous, phase. For example, it is of advantage for the powder slurry of the invention if the thickeners are in the aqueous medium, i.e., substantially outside of the particles. Where the process of the invention is used for preparing the powder coating materials of the invention, the additives are predominantly or entirely within the melts and the emulsified and suspended particles produced from them. The skilled worker is therefore able easily to determine the process variant that is optimum for the case in hand, on the basis of his or her general knowledge of the art, with or without the assistance of simple preliminary tests.

The powder slurries of the invention possess outstanding stability and storability and have an outstanding application behavior.

The powder coating materials of the invention have outstanding fluidity, storability and transportability and do not exhibit any caking even on prolonged storage. The application behavior is outstanding.

The powder slurries and powder coating materials of the invention are outstandingly suitable as coating materials, adhesives, and sealing compounds, or for preparing such compositions.

The coating materials of the invention are outstandingly suitable for producing single-coat or multicoat, color and/or effect, electrically conductive, magnetically shielding or fluorescent coatings, such as primer-surfacer coats, basecoats, solid-color topcoats or combination effect coats, or single-coat or multicoat clearcoat systems.

The adhesives of the invention are outstandingly suitable for producing adhesive films, and the sealing compounds of the invention are outstandingly suitable for producing seals.

Very particular advantages result when the unpigmented powder slurries and powder coating materials of the invention are used as clearcoats for producing single-coat or multicoat clearcoat systems. In particular, the clearcoat materials of the invention are used to produce multicoat color and/or effect coating systems by the wet-on-wet technique, in which a basecoat material, especially an aqueous basecoat material, is applied to the surface of a substrate and then the resulting basecoat film is dried, without being cured, and is overcoated with a clearcoat film. Thereafter, the two films are cured together.

Very particular advantages also result when the pigmented powder slurries and powder coating materials of the invention are used to produce single-coat or multicoat color and/or effect coating systems or combination effect coats. A combination effect coat is a coating which performs at least two functions in a color and/or effect system. Functions of this kind include in particular protection against corrosion, adhesion promotion, the absorption of mechanical energy, and the imparting of color and/or effect. Preferably, the combination effect coat serves to absorb mechanical energy and to impart color and/or effect at the same time; it therefore fulfills the functions of a primer-surfacer coat or antistonechip primer and of a basecoat. Preferably, the combination effect coat additionally has a corrosion protection effect and/or adhesion promotion effect.

The pigmented coatings or coating systems may likewise be produced using wet-on-wet techniques. For example, the pigmented powder slurries and powder coating materials of the invention may be applied to electrocoat films which have not cured, or not cured fully, and then the films one above the other are cured together.

The very particular advantage of the powder slurries and powder coating materials of the invention is that they can be used to produce multicoat systems of all kinds based entirely or predominantly on the powder slurries and powder coating materials of the invention.

In terms of its method, the application of the powder slurries of the invention has no special features but may take place by any customary application method, such as spraying, knife coating, brushing, flow coating, dipping, trickling or rolling, for example. It is preferred to employ spray application methods, such as compressed air spraying, airless spraying, high-speed rotation, electrostatic spray application (ESTA), alone or in conjunction with hot spray applications such as hot air spraying, for example. Here again, it is advisable to work in the absence of actinic radiation in order to prevent premature crosslinking of the dual-cure coating materials, adhesives, and sealing compounds of the invention.

The application of the powder coating materials of the invention also has no special features in terms of its method but instead takes place in accordance with the customary and known fluid-bed coating techniques, as known, for example, from the BASF Coatings AG brochures "Pulverlacke für Industrielle Anwendungen" [Powder coatings for industrial applications], January 2000, or "Coatings Partner, Pulverlack Spezial" [Coatings partner, powder coatings special], ½₀₀₀, or Römpp Lexikon Lacke und Druckfarben, Georg Thieme Verlag, Stuttgart, New York, 1998, pages 187 and 188, "electrostatic powder spraying", "electrostatic spraying", and "electrostatic fluidized bath process".

Suitable substrates are all those whose surface is not damaged by the application of heat and/or actinic radiation in the course of the curing of the films present thereon. Preferably, the substrates comprise metals, plastics, wood, ceramic, stone, textile, fiber composites, leather, glass, glass fibers, glass wool and rockwool, mineral- and resin-bound building materials, such as plasterboard and cement slabs or roof tiles, and also composites of these materials.

Accordingly, the coating materials, adhesives, and sealing compounds of the invention are outstandingly suitable for coating, bonding, and sealing motor vehicle bodies and parts thereof, the interior and exterior of motor vehicles, the inside and outside of buildings, doors, windows, furniture, and for coating, bonding and sealing in the context of the industrial coating, for example, of small parts, such as nuts, bolts, wheel rims or hubcaps, coils, containers, packaging, electrical components, such as motor windings or transformer windings, and of white goods, such as domestic appliances, boilers, and radiators.

In the case of electrically conductive substrates it is possible to use primers produced conventionally from electrodeposition coating materials. Both anodic and cathodic electrocoat materials are suitable for this purpose, but especially cathodic electrocoat materials. Unfunctionalized and/or nonpolar plastics surfaces may be subjected prior to coating in a known manner to a pretreatment, such as with a plasma or by flaming, or may be provided with a water-based primer.

The curing of the applied powder slurries and powder coating materials of the invention also has no special features in terms of its method but instead takes place in accordance with the customary and known thermal methods, such as heating in a forced air oven or irradiation using IR lamps. For actinic radiation curing, suitable radiation sources include those such as high- or low-pressure mercury vapor lamps, which may be doped with lead in order to open up a radiation window up to 405 nm, or electron beam sources. Further examples of suitable techniques and apparatus for curing with actinic radiation are described in the German patent application DE 198 18 735 A1, column 10 lines 31 to 61.

The resultant coatings of the invention, especially the single-coat or multicoat color and effect coating systems, combination effect coats, and clearcoats of the invention, are easy to produce and have outstanding optical properties and very high light, chemical, water, condensation, and weathering resistance. In particular they are free from turbidities and inhomogeneities. They are hard, flexible, and scratch resistant. They have very good reflow properties and outstanding intercoat adhesion, and exhibit good to very good adhesion to customary and known automotive refinishes.

The adhesive films of the invention bond a very wide variety of substrates to one another firmly and durably and possess high chemical and mechanical stability even under extreme temperatures and/or temperature fluctuations.

Similarly, the seals of the invention seal the substrates durably and possess high chemical and mechanical stability even under extreme temperatures and/or temperature fluctuations and even in conjunction with exposure to aggressive chemicals.

A further advantage of the dual-cure coating materials, adhesives and sealing compounds is that, even in the shadow zones of three-dimensional substrates of complex shape, such as vehicle bodies, radiators or electrical wound goods, and even without optimum—especially complete—illumination of the shadow zones with actinic radiation, they produce coatings, adhesive films, and seals whose profile of performance properties is at least equal to that of the coatings, adhesive films, and seals outside the shadow zones. As a result, the coatings, adhesive films and seals in the shadow zones are also no longer readily damaged by mechanical and/or chemical attack, as may occur, for example, when further components of motor vehicles are installed in the coated bodies.

Accordingly, the primed or unprimed substrates which are commonly employed in the technological fields set out above and which are coated with at least one coating of the invention, bonded with at least one adhesive film of the invention and/or sealed with at least one seal of the invention combine a particularly advantageous profile of performance properties with a particularly long service life, so making them particularly attractive economically.

EXAMPLES

Preparation Example 1

The preparation of an emulsifier for inventive use
A suitable reaction vessel fitted with three feed vessels, stirrer, reflux condenser, and oil heating was charged with 52.56 parts by weight of deionized water and this initial charge was heated to 90° Celsius. Thereafter, at this temperature, three separate feed streams were metered in to the initial charge in parallel and at a uniform rate. The first feed stream consisted of 10.18 parts by weight of acrylic acid, 18.35 parts by weight of methyl methacrylate, and 1.49 parts by weight of diphenylethylene. The second feed stream consisted of 9.9 parts by weight of a 25% strength by weight ammonia solution in water. The third feed stream consisted of a solution of 2.25 parts by weight of ammonium peroxodisulfate in 5.25 parts by weight of deionized water. The first and second feed streams were metered in over the course of one hour. The third feed stream was metered in over the course of 1.25 hours. After the end of the addition, polymerization was continued for four hours. During this time the temperature of the reaction mixture was slowly reduced. The result was a dispersion of the emulsifier for inventive use having a solids content of 33% by weight. The aqueous solution of the emulsifier had a surface tension of 50 mN/m at the critical micelle concentration.

Preparation Example 2

The preparation of a hydroxy-functional polyacrylate resin
An appropriate reaction vessel was charged with 40 parts by weight of xylene and this initial charge was heated to 130° C. By way of two separate feeds, firstly an initiator solution of 10 parts by weight of tert-butyl perethylhexanoate and 10 parts by weight of xylene and secondly a monomer mixture of 25 parts by weight of styrene, 21 parts by weight of n-butyl methacrylate, 26 parts by weight of methyl methacrylate and 28 parts by weight of 2-hydroxypropyl methacrylate were metered into this initial charge at 130° C. at a uniform rate over the course of 4 hours with stirring. The resulting reaction mixture was heated to 160° C. and the solvent was removed completely by distillation at 100 mbar. The resulting hot melt of the binder was discharged from the reaction vessel. After cooling to room temperature, a colorless solid was obtained.

Example 1

The preparation of a powder slurry of the invention
A first container was charged with a commercially customary, 3,5-dimethylpyrazole-blocked polyisocyanate based on isophorone diisocyanate, having an NCO content of 15.5% by weight.

A second container was charged with 56.07 parts by weight of the binder from Preparation Example 2, 2 parts by weight of a commercial UV absorber (Tinuvin® 1130 from Ciba Additive GmbH), 0.9 part by weight of a commercial HALS (Tinuvin® 144 from Ciba Additive GmbH), 0.4 part by weight of a commercial leveling agent (Additol® XL 490), 0.4 part by weight of benzoin and 0.5 part by weight of dibutyltin oxide.

The contents of the two containers were heated to 139° C. At this temperature there result melts whose viscosity of 10 mPas permits further processing, particularly conveying.

Before the melts were conveyed through the unit using a toothed-ring dispersing unit ("K-Generator" from Kinematica AG, Lucerne, Switzerland), the entire unit was heated to 139° C. with steam. Thereafter the two melts were metered into a static Sulzer mixer by way of separate, heated lines using volumetric pumps. By way of the volume flow of the pumps, a stoichiometric ratio of blocked isocyanate groups to hydroxyl groups was established. In the static mixer, the two melts were mixed molecularly dispersely within a very short time (<5.0 s). The resulting homogeneous melt, which still was at a temperature above the melting point of the constituents, was conveyed into the initial emulsifying zone of the toothed-ring dispersing unit via an injector pipe.

In the initial emulsifying zone an aqueous solution, consisting of 61 parts by weight of deionized water, 5 parts by weight of the emulsifier dispersion from Preparation Example 1, 0.2 part by weight of a commercial defoamer (Troykyd® from Troy Chemie GmbH) and 0.4 part by weight of a commercial wetting agent (Surfinol® TMN 6 from Air Products & Chemicals) was metered in using a volumetric pump. Before metering, the aqueous solution had been heated to the process temperature in a pressure-resistant container.

Energy input with a first rotor/stator system of the toothed-ring dispersing unit was used to produce an initial emulsion in which the aqueous solution formed the continuous phase. The initial emulsion was comminuted to an average particle size of between 1 and 3 µm in a further zone of the toothed-ring dispersing unit, with an energy input of between $10^7$ and $10^8$ J/m$^3$. The energy input of the rotor/stator system was adjusted via the gap width of the working gap between rotor and stator, by the geometry of the teeth of the respective rotor and stator, and by the rotary speed.

Following dispersion, the emulsion was cooled rapidly by injecting cold deionized water. Overall, the amounts of deionized water for initial emulsification and for cooling are such that the resulting suspension has a solids content of 35% by weight, based on the suspension.

The suspension was further admixed with 1.8 parts by weight of a commercial thickener (Acrysol® RM8 from Rohm & Haas) and was filtered through a 50 µm filter.

The powder slurry of the invention was stable to sedimentation. It had outstanding transport and application properties.

Example 2

The production of a multicoat system of the invention

To produce the multicoat system of the invention, test panels measuring 10 cm×20 cm were produced conventionally. For this purpose steel panels (vehicle body work panels) which had been coated with a customary and known cathodic electrodeposition coat, and baked, were coated with a commercial low-build primer-surfacer (Ecoprime® from BASF Coatings AG), after which the resulting primer-surfacer film was flashed off at 20° C. and a relative humidity of 65% for five minutes and dried at 80° C. in a forced air oven for five minutes. Thereafter, the primer-surfacer coats had a dry film thickness of 15 µm.

After the test panels had been cooled to 20° C., a commercial aqueous basecoat material (Ecostar® from BASF Coatings AG) was applied, flashed off at 20° C. and a relative humidity of 65% for five minutes, and dried at 80° C. in a forced air oven for 5 minutes, so that the dried basecoats had a dry film thickness of approximately 15 µm.

After the test panels had again been cooled to 20° C., the basecoats were overcoated with the powder slurry of the invention from Example 1. The resulting powder slurry clearcoat films were flashed off at 20° C. and a relative humidity of 65% for 3 minutes and dried at 60° C. in a forced air oven for 5 minutes.

Following the application of all three films, they were baked together at 155° C. for 30 minutes, so giving the multicoat system of the invention. Its clearcoat had a film thickness of 40 µm. It was highly glossy, flexible, hard, and scratch-resistant and had excellent solvent resistance (more than 100 double strokes in the methyl ethyl ketone test without damage) and good condensation resistance. The intercoat adhesion was very good.

Example 3

The preparation of a further powder slurry of the invention

Three heatable melt containers were connected via metering pumps with a static Sulzer mixer (empty volume: 0.0463 liter). The exit of the mixer was connected to a toothed-ring dispersing unit ("K-Generator" from Kinematica AG, Lucerne, Switzerland) into which a continuous aqueous phase was metered in parallel to the disperse phase (the mixture of the three melts).

The first melt container contained a mixture of
- 95.1% by weight of a polyacrylate resin containing epoxide groups, having an epoxide equivalent weight of 550 g/mol,
- 2.5% by weight of Tinuvin® CGL 1545 (commercial UV absorber from Ciba Specialty Chemicals),
- 1.3% by weight of Tinuvin® 123 (commercial reversible free-radical scavenger, HALS, from Ciba Specialty Chemicals),
- 0.3% by weight of Irgafos® P-EPQ (commercial antioxidant from Ciba Specialty Chemicals), and
- 0.8% by weight of Troy® EX 542 (commercial benzoin-containing devolatilizer from Troy, USA).

The melt was pumped into the mixer at a mass flow rate of 34 kg/h and at a temperature of 152° C. Its disperse phase fraction was 73.6% by weight.

The second melt container contained dodecanedioic acid. This was pumped into the mixer at a mass flow rate of 7.2 kg/h and at a temperature of 154° C. Its disperse phase fraction was 16.2% by weight.

The third melt container contained the blocked polyisocyanate used in Example 1. It was pumped into the mixer at a mass flow rate of 5.0 kg/h and at a temperature of 134° C. Its disperse phase fraction was 10.8% by weight.

Following a residence time of 3.5 s, the melt passed into the chamber of the toothed-ring dispersing unit (cf. Example 1).

In parallel to the metering of the melts, the continuous aqueous phase of 95% by weight of deionized water and 5.0% by weight of the emulsifier dispersion from Preparation Example 1 was metered from a further metering container at a mass flow rate of 77.5 kg/h.

The rotary speed of the toothed-ring dispersing unit was 9000 rpm.

After leaving the toothed-ring dispersing unit, the resulting emulsion was cooled rapidly using a pipe cooler. The resulting emulsion had a z-average particle size of 12.9 µm (measured using the Malvern laser scattering instrument).

The powder slurry of the invention was fully sedimentation-stable and had outstanding transport and application properties. Moreover, it was outstandingly suitable for the preparation of powder coating materials.

Example 4

The preparation of a powder coating material of the invention

The powder slurry of the invention from Example 3 was sprayed into a spray tower in such a way that the temperature of the particles did not rise above 40° C. The temperature of the drying air stream was 110° C. The water content of the powder coating material of the invention was less than 0.5% by weight. Its average particle size was 25 µm.

The powder coating material of the invention was stable in storage and in transit and did not tend to cake. Its fluidity and its application properties were outstanding. It gave smooth, highly glossy, scratch-resistant flexible, hard, and chemical-resistant clearcoats having outstanding adhesion properties.

What is claimed is:
1. A powder coating suspension prepared by a method comprising
   (1) emulsifying a liquid component comprising a liquid starting product in an aqueous medium in the presence of an emulsifier whose aqueous solution at the critical micelle concentration (CMC) has a surface tension >30 mN/m to give an aqueous emulsion of liquid particles and

(2) cooling the emulsion to solidify said liquid component so that a suspension of dimensionally stable particles is formed;

wherein the emulsifier is selected from the group consisting of copolymers prepared by copolymerization in an aqueous medium of a) at least one olefinically unsaturated monomer and b) at least one olefinically unsaturated monomer different than the olefinically unsaturated monomer (a) and of the general formula I

$$R^1R^2C=CR^3R^4 \qquad (I)$$

wherein the radicals $R^1$, $R^2$, $R^3$, and $R^4$ are each independently of one another at least one hydrogen atom, substituted or unsubstituted alkyl, cycloalkyl, alkylcycloalkyl, cycloalkylalkyl, aryl, alkylaryl, cycloalkylaryl, arylalkyl or arylcycloalkyl radicals with the proviso that at least two of the variables $R^1$, $R^2$, $R^3$, and $R^4$ are substituted or unsubstituted aryl, arylalkyl or arylcycloalkyl radicals.

2. The powder coating suspension of claim 1, wherein the monomer (b) is selected from the group consisting of diphenylethylene, dinaphthaleneethylene, cis-or trans-stilbene, vinylidenebis(4-N,N-dimethylaminobenzene), vinylidenebis(4-aminobenzene), vinylidenebis(4-nitrobenzene), and combinations thereof.

3. The powder coating suspension of claims 1, wherein monomer (a) is a carboxyl-containing olefinically unsaturated monomer.

4. The powder coating suspension of claim 1, wherein $R^1$, $R^2$, $R^3$, and/or $R^4$ of the monomers (b) are aryl radicals and are at least one of phenyl or naphthyl radicals.

5. The powder coating suspension of claim 4, wherein the aryl radicals are phenyl radicals.

6. The powder coating suspension of claim 1, wherein the substituents in the radicals $R^1$, $R^2$, $R^3$ and/or $R^4$ of the monomers (b) are at least one of the group of electron-withdrawing or electron-donating atoms or organic radicals.

7. The powder coating suspension of claim 6, wherein the substituents are selected from the group consisting of halogen atoms; nitrile; nitro; partially or fully halogenated alkyl, cycloalkyl, alkylcycloalkyl, cycloalkylalkyl, aryl, alkylaryl, cycloalkylaryl, arylalkyl, and arylcycloalkyl radicals; aryloxy, alkyloxy, and cycloalkyloxy radicals; arylthio, alkylthio, and cycloalkylthio radicals; and primary, secondary amino groups, tertiary amino groups; and mixtures thereof.

8. The powder coating suspension of claim 1, wherein the liquid component comprises a mixture of at least two meltable solid starting products in the melted state in a static mixer.

9. The powder coating suspension of claim 1, wherein the liquid component is emulsifiable with the aqueous medium in a toothed-ring dispersing unit.

10. The powder coating suspension of claim 9, wherein the toothed-ring dispersing unit comprises at least one cylindrical arrangement of at least two comminutor rings which are seated on holders, are in mutual embrace, and are rotatable in opposite directions relative to one another, the relative movement between the at least two comminutor rings resulting in a working gap having walls which extend nonparallelwise with respect to one another.

11. The powder coating suspension of claim 1, wherein the emulsifier is present in the aqueous medium.

12. The powder coating suspension of claim 1, which is curable with at least one of physical curing, thermal curing, or actinic radiation.

13. The powder coating suspension of claim 1, which is a one-component system.

14. The powder coating suspension of claim 1 wherein at least two of the variables $R^1$, $R^2$, $R^3$, and $R^4$ are substituted or unsubstituted aryl radicals.

15. A method of coating a substrate, comprising applying the powder coating suspension of claim 1 to a substrate.

16. The method of claim 15, wherein the substrate is at least one substrate selected from the group consisting of motor vehicle bodies and parts thereof, interior and exterior of motor vehicles, the inside and outside of buildings, doors, windows, furniture, small parts, coils, containers, packaging, electrical components, and white goods.

17. The method of claim 15 wherein the powder coating suspension is at least one of a coating material, an adhesive, or a sealing compound.

18. A powder coating material prepared by isolating the dimensionally stable particles of the powder coating suspension of claim 1, thereby forming a powder coating material that is stable against caking.

19. The powder coating material of claim 18, wherein the dimensionally stable particles are prepared by at least one of spray drying or freeze drying.

20. A process for preparing a powder coating suspension comprising (1) emulsifying at least one liquid component comprising at least one liquid starting product in an aqueous medium in the presence of at least one emulsifier whose aqueous solution at the critical micelle concentration (CMC) has a surface tension >30 mN/m to give an aqueous emulsion of liquid particles and (2) cooling the emulsion to solidify said liquid component so that a suspension of dimensionally stable particles is formed;

the emulsifier is selected from the group consisting of copolymers prepared by copolymerization in an aqueous medium of a) at least one olefinically unsaturated monomer and b) at least one olefinically unsaturated monomer different than the olefinically unsaturated monomer (a) and of the general formula I

$$R^1R^2C=CR^3R^4 \qquad (I)$$

wherein the radicals $R^1$, $R^2$, $R^3$, and $R^4$ are each independently of one another at least one hydrogen atom, substituted or unsubstituted alkyl, cycloalkyl, alkylcycloalkyl, cycloalkylalkyl, aryl, alkylaryl, cycloalkylaryl, arylalkyl or arylcycloalkyl radicals with the proviso that at least two of the variables $R^1$, $R^2$, $R^3$, and $R^4$ are substituted or unsubstituted aryl, arylalkyl or arylcycloalkyl radicals.

21. A process for preparing a powder coating material, comprising (1) emulsifying at least one liquid component comprising at least one liquid starting product in an aqueous medium in the presence of at least one emulsifier whose aqueous solution at the critical micelle concentration (CMC) has a surface tension >30 mN/m to give an aqueous emulsion of liquid particles and (2) cooling the emulsion to solidify said liquid component so that a suspension of dimensionally stable particles is formed, and (3) isolating the dimensionally stable particles;

the emulsifier is selected from the group consisting of copolymers prepared by copolymerization in an aqueous medium of a) at least one olefinically unsaturated monomer and b) at least one olefinically unsaturated monomer different than the olefinically unsaturated monomer (a) and of the general formula I

$$R^1R^2C=CR^3R^4 \qquad (I)$$

wherein the radicals $R^1$, $R^2$, $R^3$, and $R^4$ are each independently of one another at least one hydrogen atom, substituted or unsubstituted alkyl, cycloalkyl, alkylcycloalkyl, cycloalkylalkyl, aryl, alkylaryl, cycloalkylaryl, arylalkyl or arylcycloalkyl radicals with the proviso that at least two of the variables $R^1$, $R^2$, $R^3$, and $R^4$ are substituted or unsubstituted aryl, arylalkyl or arylcycloalkyl radicals, thereby forming a powder coating material that is stable against caking.

* * * * *